(12) United States Patent
Tsai et al.

(10) Patent No.: US 12,546,920 B2
(45) Date of Patent: Feb. 10, 2026

(54) LOW REFLECTION LAYER, OPTICAL LENS ASSEMBLY, IMAGING APPARATUS AND ELECTRONIC DEVICE

(71) Applicant: LARGAN PRECISION CO., LTD., Taichung (TW)

(72) Inventors: Wen-Yu Tsai, Taichung (TW); Cheng-Yu Tsai, Taichung (TW); Chun-Hung Teng, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 289 days.

(21) Appl. No.: 18/187,744

(22) Filed: Mar. 22, 2023

(65) Prior Publication Data

US 2023/0305200 A1  Sep. 28, 2023

Related U.S. Application Data

(60) Provisional application No. 63/322,667, filed on Mar. 23, 2022.

(51) Int. Cl.
*G02B 5/08* (2006.01)
*G02B 1/18* (2015.01)
*G02B 13/00* (2006.01)

(52) U.S. Cl.
CPC ............. *G02B 5/0808* (2013.01); *G02B 1/18* (2015.01); *G02B 13/0065* (2013.01); *G02B 2207/101* (2013.01)

(58) Field of Classification Search
CPC .... G02B 5/0808; G02B 1/18; G02B 13/0065; G02B 2207/101; G02B 1/115; G02B 1/118; G02B 1/111; G02B 13/0055

USPC ......................................................... 359/726
See application file for complete search history.

(56) References Cited

U.S. PATENT DOCUMENTS

| | | | |
|---|---|---|---|
| 2005/0233083 A1 | 10/2005 | Schulz | |
| 2006/0275627 A1* | 12/2006 | Biteau | C09D 183/08 428/817 |
| 2007/0104922 A1* | 5/2007 | Zhai | C09D 139/00 428/141 |
| 2009/0261063 A1 | 10/2009 | Munzert | |
| 2010/0035069 A1 | 2/2010 | Li | |
| 2011/0051246 A1 | 3/2011 | Schulz | |

(Continued)

FOREIGN PATENT DOCUMENTS

| | | |
|---|---|---|
| CN | 102317228 A | 1/2012 |
| CN | 103185905 A | 7/2013 |

(Continued)

*Primary Examiner* — Mohammed A Hasan
(74) *Attorney, Agent, or Firm* — McClure, Qualey & Rodack, LLP

(57) ABSTRACT

An optical lens assembly includes at least one optical lens element and at least one optical element. At least one surface of the at least one optical lens element or the at least one optical element includes a low reflection layer, and the low reflection layer includes a rough layer, a nanocrystalline particle and a hydrophobic layer. The nanocrystalline particle is disposed between the rough layer and the hydrophobic layer, and the hydrophobic layer is farther away from the surface of the at least one optical lens element or the at least one optical element than the nanocrystalline particle. A material of the nanocrystalline particle at least includes $SiO_2$.

27 Claims, 22 Drawing Sheets

(56) References Cited

U.S. PATENT DOCUMENTS

| | | | | |
|---|---|---|---|---|
| 2011/0281068 | A1 | 11/2011 | David | |
| 2012/0009429 | A1* | 1/2012 | Shmueli | C09D 5/006 |
| | | | | 106/286.6 |
| 2015/0153484 | A1* | 6/2015 | Neuffer | G02B 1/18 |
| | | | | 351/159.57 |
| 2017/0315269 | A1 | 11/2017 | Ogane | |
| 2020/0174167 | A1* | 6/2020 | Chu | G02B 1/118 |
| 2021/0165136 | A1* | 6/2021 | Tsai | G02B 13/18 |
| 2022/0400193 | A1* | 12/2022 | Tsai | G02B 1/115 |

FOREIGN PATENT DOCUMENTS

| | | |
|---|---|---|
| CN | 111208588 A | 5/2020 |
| TW | 202022472 A | 6/2020 |

\* cited by examiner

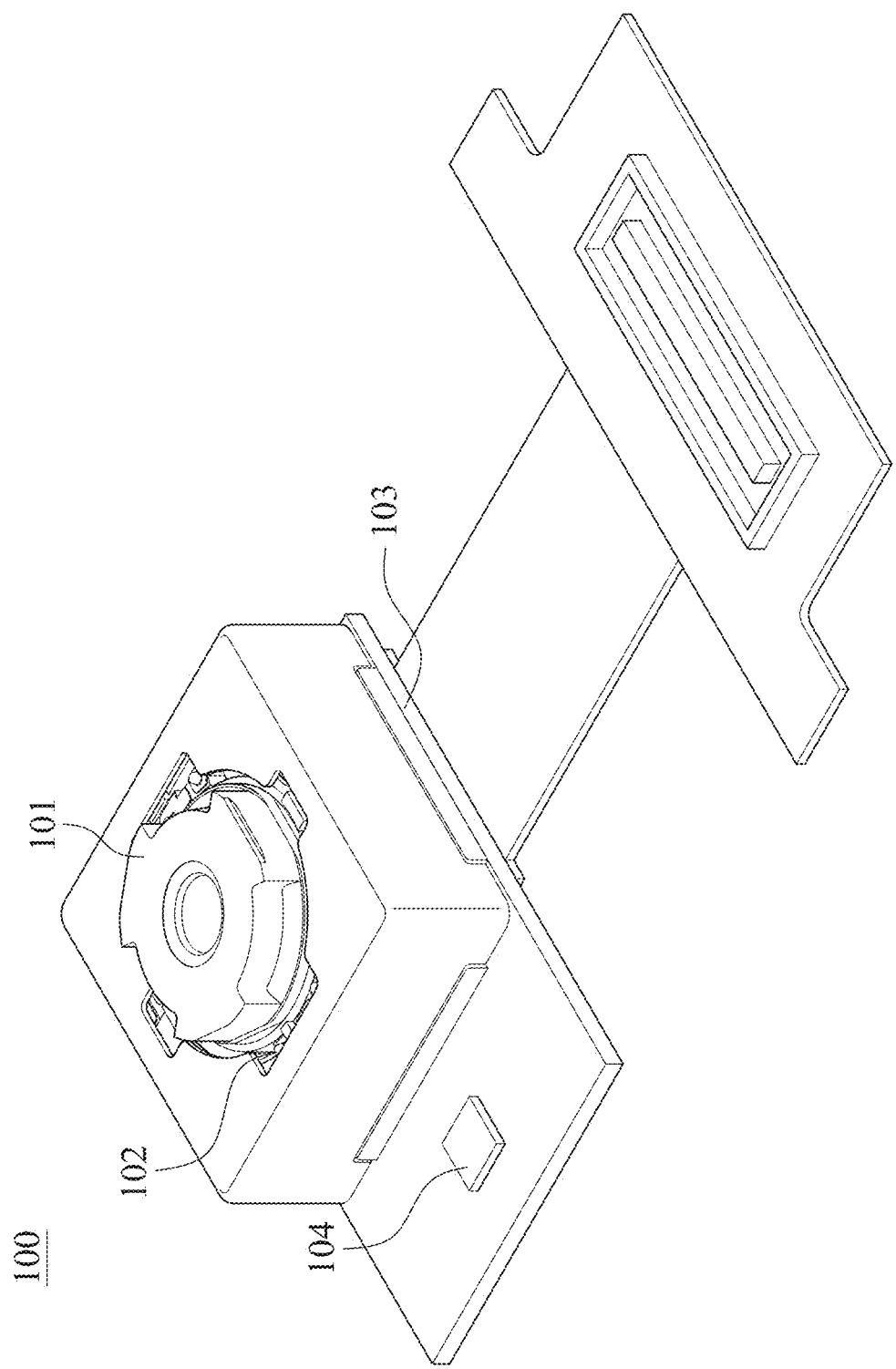

LOW REFLECTION LAYER, OPTICAL LENS ASSEMBLY, IMAGING APPARATUS AND ELECTRONIC DEVICE

RELATED APPLICATIONS

This application claims priority to U.S. Provisional Application Ser. No. 63/322,667 filed Mar. 23, 2022, which is herein incorporated by reference.

BACKGROUND

Technical Field

The present disclosure relates to an optical lens assembly, an imaging apparatus and an electronic device. More particularly, the present disclosure relates to an optical lens assembly, an imaging apparatus and an electronic device including an optical lens element or an optical element, and the surfaces of the optical lens element or the optical element include a low reflection layer.

Description of Related Art

In recent years, it has become more and more popular to use a miniature optical lens assembly of a mobile device for photographing. However, the performance of the mobile device is often affected by strong sunlight in the outdoor environment, resulting in that the image quality of the optical lens assembly is greatly reduced by strong non-imaging stray lights.

In the prior arts, a surface of the opaque optical elements of the optical lens assembly is treated by the ink-painting method, the sandblasting method and the coating method so as to reduce the reflectance thereof and eliminate the stray light. However, although the image quality of the optical lens assembly can be enhanced by the aforementioned treatments, the high-intensity stray light still cannot be eliminated effectively. Further, in the field of the optical lens assembly applied in the non-mobile devices, there are other methods used to reduce the reflectance. For example, a porous microstructure can be formed by etching the surface of the film on the optical lens assembly, but the structural support of the porous microstructure is insufficient, so that the film-layer surface is easy to deform when an external force is applied thereon, and the anti-reflection effect thereof will be greatly reduced. Moreover, although most of the prior arts can achieve a better anti-reflection effect by a multi-layer coating method, the multi-layer preparing process is complicated, and the cost of the coating is high, making it impossible to be widely used in the field of the optical lens assembly.

SUMMARY

According to one aspect of the present disclosure, an optical lens assembly includes at least one optical lens element and at least one optical element. At least one surface of the at least one optical lens element or the at least one optical element includes a low reflection layer, and the low reflection layer includes a rough layer, a nanocrystalline particle and a hydrophobic layer. The nanocrystalline particle is disposed between the rough layer and the hydrophobic layer, and the hydrophobic layer is farther away from the surface of the at least one optical lens element or the at least one optical element than the nanocrystalline particle. A material of the nanocrystalline particle at least includes $SiO_2$. When an average diameter of the nanocrystalline particle is DC, the following condition is satisfied: 200 nm<DC<1000 nm.

According to one aspect of the present disclosure, an imaging apparatus includes an optical lens assembly and at least one carrier. At least one surface of the optical lens assembly or the at least one carrier includes a low reflection layer, and the low reflection layer includes a rough layer, a nanocrystalline particle and a hydrophobic layer. The nanocrystalline particle is disposed between the rough layer and the hydrophobic layer, and the hydrophobic layer is farther away from the surface of the optical lens assembly or the at least one carrier than the nanocrystalline particle. A material of the nanocrystalline particle at least includes $SiO_2$. When an average diameter of the nanocrystalline particle is DC, the following condition is satisfied: 200 nm<DC.

According to one aspect of the present disclosure, an electronic device includes the imaging apparatus according to the aforementioned aspect.

According to one aspect of the present disclosure, a low reflection layer includes a rough layer, a nanocrystalline particle and a hydrophobic layer. The nanocrystalline particle is disposed between the rough layer and the hydrophobic layer. When an average diameter of the nanocrystalline particle is DC, and a reflectance in a wavelength range of 400 nm-1000 nm of a surface including the low reflection layer is R40100, the following conditions are satisfied: 200 nm<DC<1000 nm; and 0%<R40100≤2.4%.

BRIEF DESCRIPTION OF THE DRAWINGS

The present disclosure can be more fully understood by reading the following detailed description of the embodiment, with reference made to the accompanying drawings as follows:

FIG. 11 is a three-dimensional schematic view of an imaging apparatus according to Example 5 of the present disclosure.

DETAILED DESCRIPTION

Figure 1:
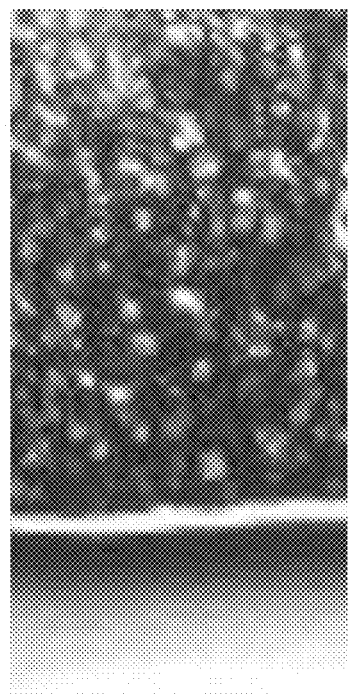
FIG. 1 is a surface diagram of a substrate according to Comparative example 1.

According one embodiment of the present disclosure, an optical lens assembly includes at least one optical lens element and at least one optical element. At least one surface of the optical lens element or the optical element includes a low reflection layer, and the low reflection layer includes a rough layer, a nanocrystalline particle and a hydrophobic layer. The nanocrystalline particle is disposed between the rough layer and the hydrophobic layer, and the hydrophobic layer is farther away from the surface of the optical lens element or the optical element than the nanocrystalline particle. A material of the nanocrystalline particle at least includes $SiO_2$. When an average diameter of the nanocrystalline particle is DC, the following condition is satisfied: 200 nm<DC<1000 nm. Therefore, by the arrangements that the at least one surface of the optical lens element or the optical element of the optical lens assembly includes the low reflection layer, a surface of the low reflection layer is treated with a roughening process, and then a nucleation reaction is performed thereon with appropriate materials, the surficial structure including nanocrystalline particles can be obtained by the crystallization process. Because the surface of the low reflection layer includes the nanocrystalline particles with proper particle sizes, the intensity of stray light being incident thereon can be further destroyed and suppressed. Further, a gradual distribution of the reflectance between the surface of the optical lens element or the optical element and the air can be achieved by the nanocrystalline particles made of nano-materials with a proper refractive index, and thus the light can be incident smoothly but not be reflected. Accordingly, it is favorable for maintaining an ultra-low reflectance of the surface of the optical lens element or the optical element, so as to significantly enhance the image quality of the optical lens assembly of the present disclosure. Furthermore, by the arrangement that the hydrophobic layer is coated on the outer layer of the low reflection layer, it is favorable for preventing the adhesive from diffusing during the assembly of the optical lens assembly and then resulting in serious reflection, and the structure of the internal reflection layer can be protected without affecting the ultra-low reflection effect.

According another embodiment of the present disclosure, an imaging apparatus includes an optical lens assembly and at least one carrier. At least one surface of the optical lens assembly or the carrier includes a low reflection layer, and the low reflection layer includes a rough layer, a nanocrystalline particle and a hydrophobic layer. The nanocrystalline particle is disposed between the rough layer and the hydrophobic layer, and the hydrophobic layer is farther away from the surface of the optical lens assembly or the carrier than the nanocrystalline particle. A material of the nanocrystalline particle at least includes $SiO_2$. When an average diameter of the nanocrystalline particle is DC, the following condition is satisfied: 200 nm<DC. Therefore, by the arrangements that the at least one surface of the optical lens assembly or the carrier of the imaging apparatus includes the low reflection layer, a surface of the low reflection layer is treated with a roughening process, and then the nucleation reaction is performed thereon with appropriate materials, the surficial structure including nanocrystalline particles can be obtained by the crystallization process. Because the surface of the low reflection layer includes the nanocrystalline particles with proper particle sizes, the intensity of stray light being incident thereon can be further destroyed and suppressed. Further, a gradual distribution of the reflectance between the surface of the optical lens element or the optical element and the air can be achieved by the nanocrystalline particles made of nano-materials with a proper refractive index, and thus the light can be incident smoothly but not be reflected. Accordingly, it is favorable for maintaining an ultra-low reflectance of the surface of the optical lens assembly or the carrier, so as to significantly enhance the image quality of the imaging apparatus of the present disclosure. Furthermore, by the arrangement that the hydrophobic layer is coated on the outer layer of the low reflection layer, it is favorable for preventing the adhesive from diffusing during the assembly of the imaging apparatus and then resulting in serious reflection, and the structure of the internal reflection layer can be protected without affecting the ultra-low reflection effect.

According further another embodiment of the present disclosure, a low reflection layer includes a rough layer, a nanocrystalline particle and a hydrophobic layer, wherein the nanocrystalline particle is disposed between the rough layer and the hydrophobic layer. A material of the nanocrystalline particle at least includes $SiO_2$. When an average diameter of the nanocrystalline particle is DC, and a reflectance in a wavelength range of 400 nm-1000 nm of a surface including the low reflection layer is R40100, the following conditions are satisfied: 200 nm<DC<1000 nm; and 0%<R40100≤2.4%. Therefore, the surficial structure including nanocrystalline particles can be obtained by treating a surface of the low reflection layer with a roughening process and then performing the nucleation reaction thereon with appropriate materials. Because the surface of the low reflection layer includes the nanocrystalline particles with proper particle sizes, the intensity of stray light being incident thereon can be further destroyed and suppressed. Further, the light can be incident to the surface smoothly but not be reflected by the nanocrystalline particles made of nano-materials with a proper refractive index, so that it is favorable for maintaining an ultra-low reflectance.

Furthermore, by the arrangement that the hydrophobic layer is coated on the outer layer of the low reflection layer, it is favorable for preventing the adhesive from diffusing and then resulting in serious reflection, and the structure of the internal reflection layer can be protected without affecting the ultra-low reflection effect.

In the present disclosure, when the average diameter of the nanocrystalline particle is DC, the following condition can be satisfied: 200 nm<DC<800 nm. Furthermore, the following condition can be satisfied: 200 nm<DC<600 nm. Furthermore, the following condition can be satisfied: 200 nm<DC<400 nm. Furthermore, the following condition can be satisfied: 240 nm<DC<350 nm.

In the present disclosure, a material of the hydrophobic layer can be selected from a polyurethane compound, a polyimide compound, an organosilane compound, a fluoroalkane compound, a fluoroalkenyl ether polymer, a fluorosilane compound or a fluoroacrylate compound. Therefore, by the arrangement that the hydrophobic layer is coated on the outer layer, it is favorable for preventing the adhesive or the aqueous solution from diffusing on the surface of the low reflection layer and then resulting in serious reflection, and the structure of the internal reflection layer can be protected without affecting the ultra-low reflection effect.

In the present disclosure, the nanocrystalline particle can be a multi-layer structure, and the nanocrystalline particle includes at least one high refractive index layer and at least one low refractive index layer. The high refractive index layer and the low refractive index layer are arranged by alternately, and the low refractive index layer is closer to the hydrophobic layer than the high refractive index layer. A main material of the low refractive index layer is $SiO_2$. Therefore, by the arrangement that the high refractive index layer and the low refractive index layer are arranged by alternately, it is favorable for reducing the reflection of light on the surface of the layer by destructive interference.

In the present disclosure, when a height of the nanocrystalline particle is Tc, the following condition can be satisfied: 200 nm<Tc<800 nm. Therefore, by the arrangement that the height of the nanocrystalline particle is designed properly, it is favorable for maintaining the structural integrity of the nanocrystalline particle so as to achieve the best low reflection effect. Furthermore, the following condition can be satisfied: 200 nm<Tc<700 nm. Furthermore, the following condition can be satisfied: 200 nm<Tc<600 nm. Furthermore, the following condition can be satisfied: 200 nm<Tc<500 nm. Furthermore, the following condition can be satisfied: 240 nm<Tc<400 nm.

In the present disclosure, when the reflectance in the wavelength range of 400 nm-1000 nm of the surface including the low reflection layer is R40100, the following condition can be satisfied: 0%<R40100≤2.0%. Therefore, the reflection effect of light in a wide wavelength range on the surface can be effectively controlled, and it is favorable for increasing the low reflection effect in the wide wavelength range. Furthermore, the following condition can be satisfied: 0%<R40100≤1.5%. Furthermore, the following condition can be satisfied: 0%<R40100≤1.0%. Furthermore, the following condition can be satisfied: 0.1%≤R40100≤0.7%.

In the present disclosure, when a reflectance in a wavelength range of 400 nm-700 nm of the surface including the low reflection layer is R4070, the following condition can be satisfied: 0%<R4070≤2.5%. Therefore, the reflection effect of light in the visible light wavelength range on the surface can be effectively controlled, and it is favorable for increasing the low reflection effect in the wavelength ranges of the blue visible light, the green visible light and the red visible light. Furthermore, the following condition can be satisfied: 0%<R4070≤2.0%. Furthermore, the following condition can be satisfied: 0%<R4070≤1.5%. Furthermore, the following condition can be satisfied: 0%<R4070≤1.0%. Furthermore, the following condition can be satisfied: 0.1%≤R4070≤0.7%.

In the present disclosure, when a reflectance in a wavelength range of 500 nm-700 nm of the surface including the low reflection layer is R5070, the following condition can be satisfied: 0%<R5070≤2.4%. Therefore, the reflection effect of light in a particular wavelength range on the surface can be effectively controlled, and it is favorable for increasing the low reflection effect in the particular wavelength range. Furthermore, the following condition can be satisfied: 0%<R5070≤2.0%. Furthermore, the following condition can be satisfied: 0%<R5070≤1.5%. Furthermore, the following condition can be satisfied: 0%<R5070≤1.0%. Furthermore, the following condition can be satisfied: 0.1%≤R5070≤0.7%.

In the present disclosure, when a reflectance in a wavelength range of 400 nm-600 nm of the surface including the low reflection layer is R4060, the following condition can be satisfied: 0%<R4060≤2.5%. Therefore, it is favorable for effectively absorbing the stray light, and the low reflection effect of the surface in a particular wavelength range can be maintained. Furthermore, the following condition can be satisfied: 0%<R4060≤2.0%. Furthermore, the following condition can be satisfied: 0%<R4060≤1.5%. Furthermore, the following condition can be satisfied: 0%<R4060≤1.0%. Furthermore, the following condition can be satisfied: 0.1%≤R4060≤0.7%.

In the present disclosure, when a reflectance in a wavelength range of 500 nm-600 nm of the surface including the low reflection layer is R5060, the following condition can be satisfied: 0%<R5060≤2.4%. Therefore, it is favorable for effectively absorbing the stray light in a particular wavelength range, such as the stray light in the green visible wavelength range, and the low reflection effect of the surface can be maintained. Furthermore, the following condition can be satisfied: 0%<R5060≤2.0%. Furthermore, the following condition can be satisfied: 0%<R5060≤1.5%. Furthermore, the following condition can be satisfied: 0%<R5060≤1.0%. Furthermore, the following condition can be satisfied: 0.1%≤R5060≤0.7%.

In the present disclosure, when a reflectance in a wavelength range of 700 nm-1000 nm of the surface including the low reflection layer is R70100, the following condition can be satisfied: 0%<R70100≤2.2%. Therefore, the reflection effect of light in the near-infrared wavelength range on the surface can be effectively controlled, and it is favorable for increasing the low reflection effect in the long wavelength range. Furthermore, the following condition can be satisfied: 0%<R70100≤2.0%. Furthermore, the following condition can be satisfied: 0%<R70100≤1.6%. Furthermore, the following condition can be satisfied: 0%<R70100≤1.2%. Furthermore, the following condition can be satisfied: 0.1%≤R70100≤1.0%.

In the present disclosure, when a reflectance in a wavelength range of 800 nm-1000 nm of the surface including the low reflection layer is R80100, the following condition can be satisfied: 0%<R80100≤2.2%. Therefore, it is favorable for effectively absorbing the stray light in the near-infrared wavelength range, and the low reflection effect of the surface can be maintained. Furthermore, the following condition can be satisfied: 0%<R80100≤2.0%. Furthermore, the following condition can be satisfied: 0%<R80100≤1.6%. Furthermore, the following condition can be satisfied: 0%<R80100≤1.2%. Furthermore, the following condition can be satisfied: 0.1%≤R80100≤1.0%.

In the present disclosure, when a reflectance in a wavelength range of 900 nm-1000 nm of the surface including the low reflection layer is R90100, the following condition can be satisfied: 0%<R90100≤2.2%. Therefore, it is favorable for effectively absorbing the stray light in the near-infrared wavelength range, and the low reflection effect of the surface can be maintained. Furthermore, the following condition can be satisfied: 0%<R90100≤2.0%. Furthermore, the following condition can be satisfied: 0%<R90100≤1.8%. Furthermore, the following condition can be satisfied: 0%<R90100≤1.5%. Furthermore, the following condition can be satisfied: 0.1%≤R90100≤1.3%.

In the optical lens element of the present disclosure, the low reflection layer can be disposed on a non-effective area of an object-side surface facing an object side of the optical lens assembly, a non-effective area of an image-side surface facing an image side of the optical lens assembly, or a peripheral surface connected between the object-side surface and the image-side surface of the optical lens element. Therefore, the stray light caused by the reflection around the peripheral area can be effectively reduced.

In the present disclosure, the number of the optical element can be one or more properly so as to restrict the form of the light passing through the optical lens assembly. The optical element can be, but not be limited, a light-blocking element, an annular spacer element, a barrel element, a cover glass, a blue glass, a filter, a color filter, a light path folding element, a prism, a mirror, etc. The optical element can be a monolithic element, a composite element or a thin film, but the present disclosure is not limited thereto. The optical element can be disposed on the object side or the image side of the optical lens assembly, or between the optical lens elements. Thus, it is favorable for controlling the passing of the light with a specific form so as to meet the application requirements.

In the present disclosure, the light-blocking element can be disposed in front of the optical lens element or on the back thereof. The light-blocking element is usually an annular sheet with dark color so as to absorb the stray light.

In the present disclosure, the annular spacer element can be disposed in front of the optical lens element or on the back thereof. Thus, a larger space between the optical lens elements can be provided, and it is favorable for adjusting a proper space between the optical lens elements and stabilizing the assembly of the optical lens elements.

In the present disclosure, the barrel element is a cylindrical cover that can carry the optical lens element, the light-blocking element and the annular spacer element, and has the function of fixing and protecting the elements disposed therein.

In the present disclosure, the carrier can be any of a non-optical lens element or a non-optical element that can be touched by the light path of the imaging apparatus. The carrier can be a mirror holder of the optical lens assembly which is for positioning or carrying the imaging apparatus and the optical lens assembly, a micro lens disposed on an image sensor, or a glass sheet disposed around the peripheral region of the substrate of the image sensor or for protecting the image sensor. The carrier can be disposed on an object side or an image side of the imaging apparatus, or around the imaging apparatus. Thus, it is favorable for reducing the reflected light caused by the peripheral light being incident to the surface of the carrier.

In the present disclosure, the dry etching technology is a roughening process which can be an etching technology without liquid, and the dry etching technology can be divided into the physical sputtering (ion grinding), the reactive ion etching and the plasma etching. The physical sputtering is also known as ion grinding or ion milling. The anisotropic etching and surface destruction can be performed by the transmission of physical kinetic energy, wherein the environment thereof is usually less than 100 millitorr. Argon (Ar) and oxygen can be used as the gas, and then the workpiece is obliquely bombarded with high excitation energy ion impact and sputtering effect, so that the atoms on the surface of the material are stripped one by one, and thus the aforementioned process belongs to the processing technology of nanometer and atomic scale.

In the present disclosure, the rough layer can be processed by the roughening process of the dry etching technology, so that a plurality of irregular pores can be formed on in the internal structure and on the surface of the rough layer. Accordingly, the multiple reflecting effects can be provided by the undulations of the internal structure and the surface and then a light trap structure can be formed, and thus it is favorable for increasing the area of absorbing light and reducing the total internal reflection.

In the present disclosure, a material of the rough layer can be a black ink spraying layer formed with an epoxy-based fast-drying ink, a black coating layer prepared by the chemical vapor deposition, a photoresistive coating layer, or other dark coatings with light absorbing effect. The coating layer is easy to apply and adhere to the surface of the elements and is suitable for mass processing and manufacturing.

In the present disclosure, the nucleation reaction can form a uniform nano-layer film or a nanocrystalline particle with a multi-layer structure according to the surface roughness of the material to be coated.

In the present disclosure, the average diameter of the nanocrystalline particle is measured by observing the top view of the low reflection layer with an electron microscope, and then preferentially selecting the particles that are closer to the air and conform to granular or spherical shapes, and a maximum diameter of a single particle is measured. Then, at least 5 particles within an area of 36 $\mu m^2$ are selected for average calculation.

In the present disclosure, each of the crystal surface images is about 6 μm in width and 6 μm in length, and the total area is about 36 $\mu m^2$.

In the present disclosure, the calculation of the height of the nanocrystalline particle is to observe the cross-section of the low reflection layer with an electron microscope. If the nanocrystalline particle selected to be tested is in contact with the rough layer, a maximum height in the direction perpendicular to the surface in which the nanocrystalline particle and the rough layer are contacted is measured. If the nanocrystalline particle selected to be tested is in contact with at least one more of the nanocrystalline particles, a maximum height in the direction perpendicular to the surface in which the nanocrystalline particle to be tested and the at least one more of the nanocrystalline particles are contacted is measured.

In the present disclosure, the nano-material of the nanocrystalline particle can be metal or non-metal oxides, such as $SiO_2$, $Al_2O_3$, $TiO_2$, $Ta_2O_5$, $TeO_2$, ZnO, $ZrO_2$, $GeO_2$, MgO, etc. The nano-material of the nanocrystalline particle also can be a metal nitride, such as AlN, SiN, $Si_3N_4$, etc. The nano-material of the nanocrystalline particle also can be metal fluorides, such as $MgF_2$, $CaF_2$, etc.

In the present disclosure, the material of the hydrophobic layer can be a polyurethane compound including isocyanate groups, a polyimide compound including cyclic imides, an organosilane compound including alkoxy groups, a fluorinated polyurethane compound, a perfluoroalkane compound, a fluoroalkenyl ether polymer, a fluorosilane compound, a fluoroacrylate compound, or other fluorinated alkyl polymers, such as Polyurethane (PUR), Poly(N-isopropylacrylamide) (PNIPA), Poly(1,1,2,2-tetrafluoroethylene) (PTFE), Pentadecafluorooctanoic acid (PFOA), 1,1,2,2,3,3, 4,4,5,5,6,6,7,7,8,8-Heptadecafluorooctane-1-sulfonic acid (PFOS), Triethoxy(1H,1H,2H,2H-nonafluorohexyl)silane, and 2,2,2-trifluoroethyl 2-methylprop-2-enoate.

Figure 16A:
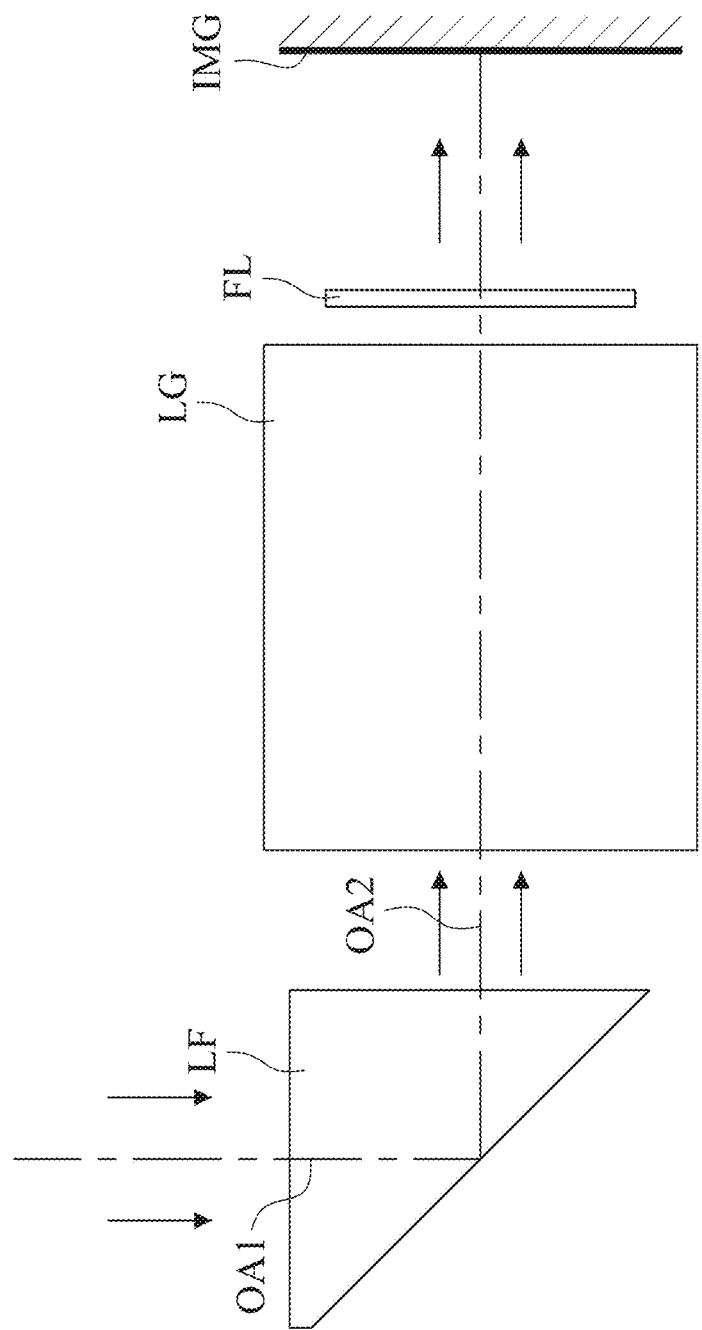
FIG. 16A is a schematic view of an arrangement of a light path folding element in an optical lens assembly of the present disclosure.
Figure 16B:
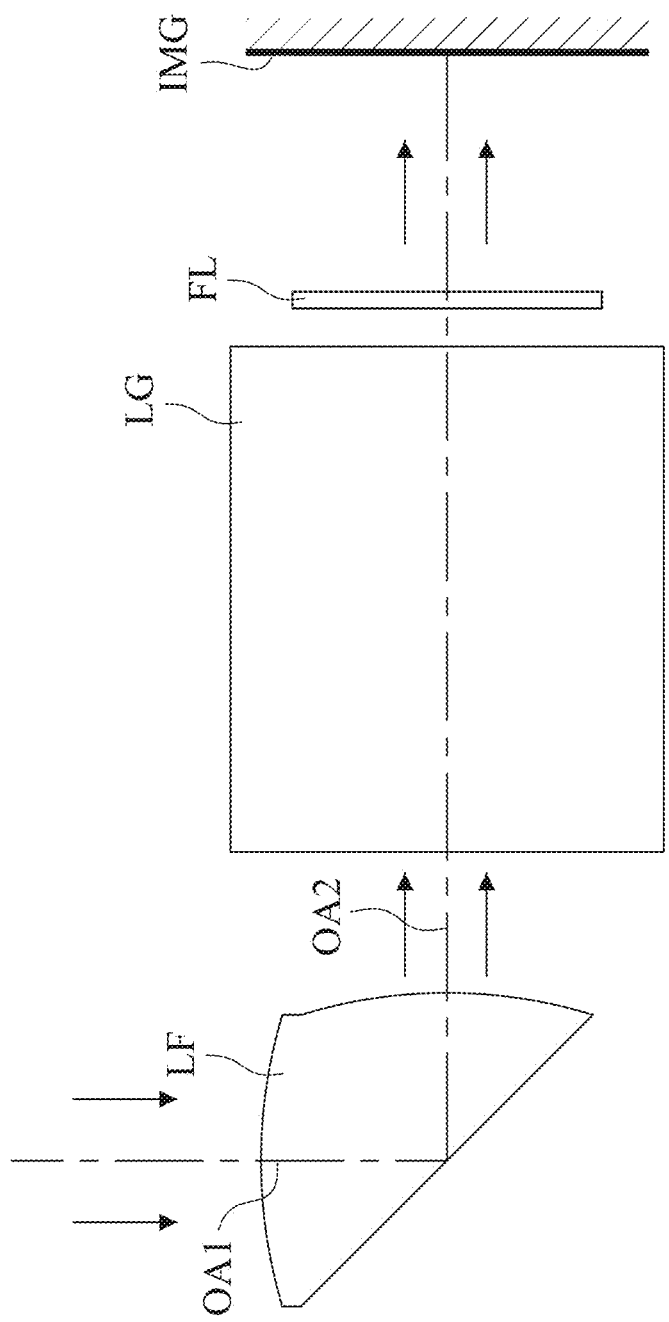
FIG. 16B is a schematic view of another arrangement of the light path folding element in the optical lens assembly of the present disclosure.
Figure 16C:
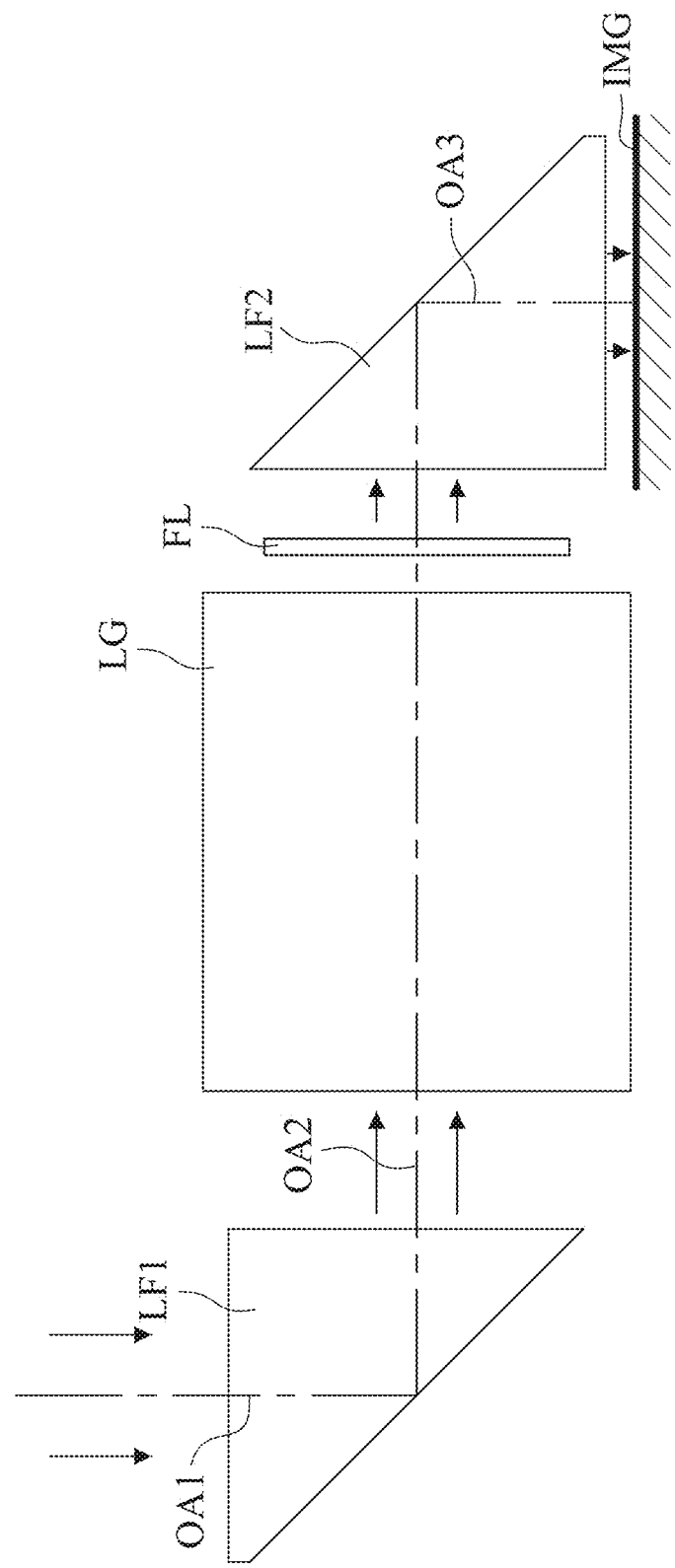
FIG. 16C is a schematic view of an arrangement of two light path folding elements in an optical lens assembly of the present disclosure.
Figure 16D:
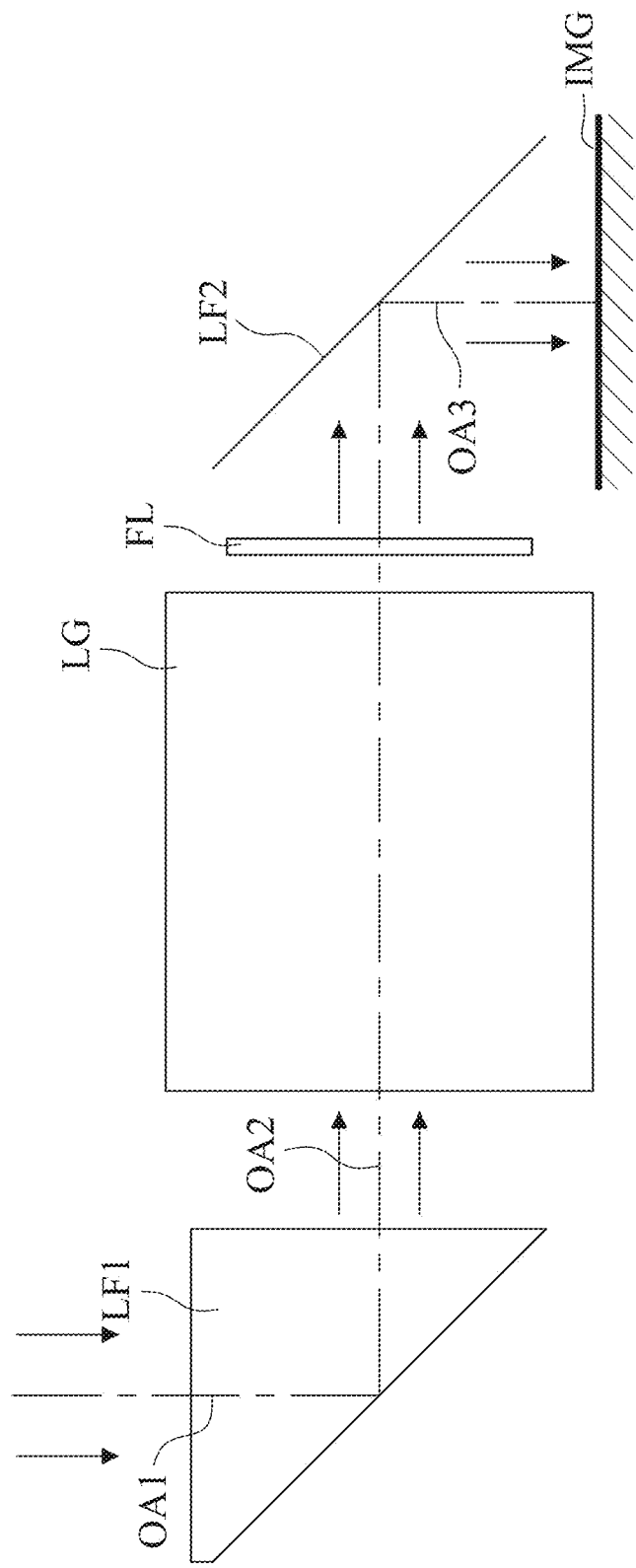
FIG. 16D is a schematic view of another arrangement of the two light path folding elements in the optical lens assembly of the present disclosure.
Figure 16E:
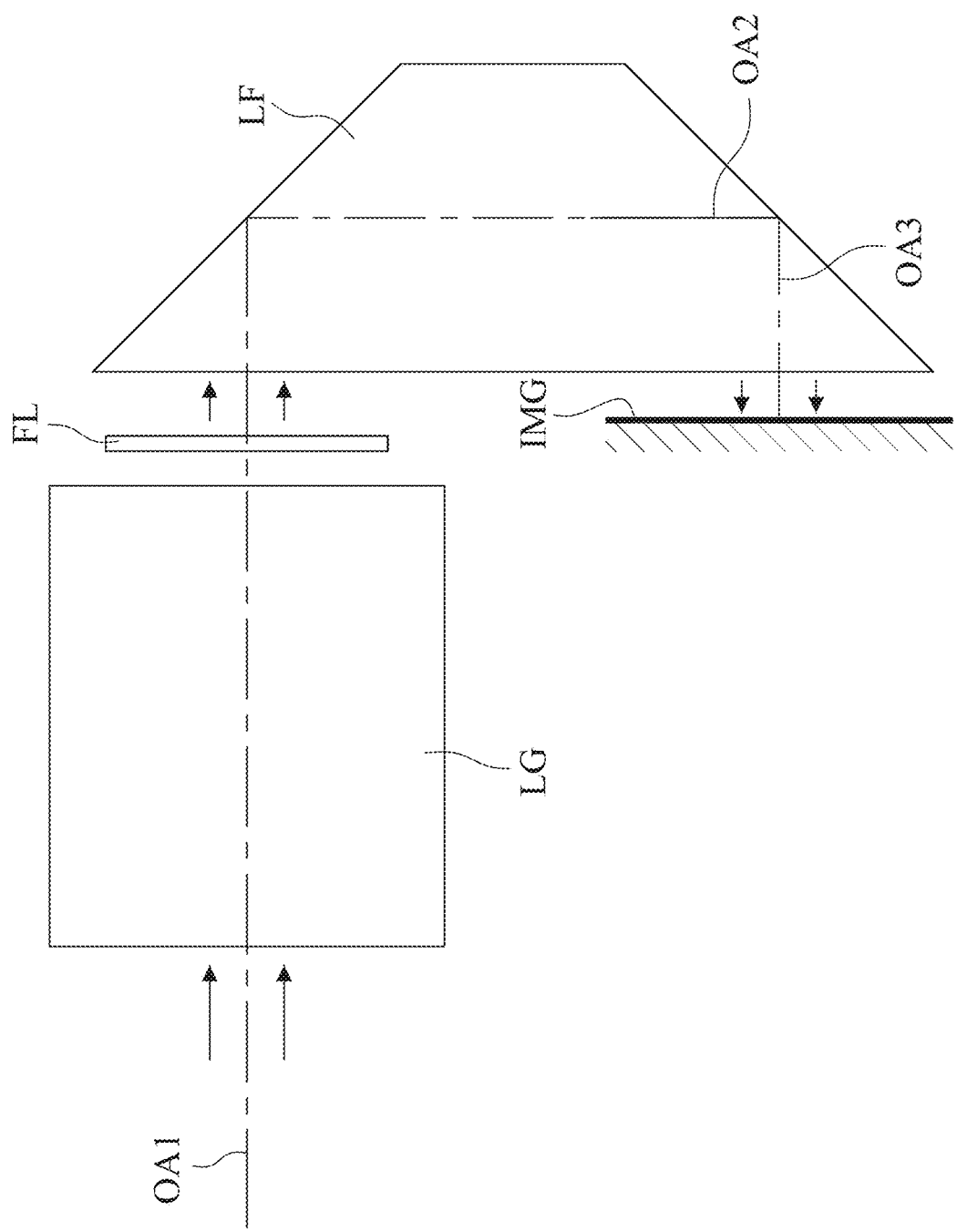
FIG. 16E is a schematic view of further another arrangement of a light path folding element in an optical lens assembly of the present disclosure.

In the optical lens assembly of the present disclosure, at least one element with light path folding function, such as a prism or a mirror, can be selectively disposed between an imaged object and an image surface of the optical lens assembly. Therefore, it is favorable for providing high flexible space arrangement of the optical lens assembly, and the compactness of the electronic device would not be restricted by the optical total track length of the optical lens assembly. In more detail, FIG. 16A is a schematic view of an arrangement of a light path folding element LF in an optical lens assembly of the present disclosure, and FIG. 16B is a schematic view of another arrangement of the light path folding element LF in the optical lens assembly of the present disclosure. As shown in FIG. 16A and FIG. 16B, the optical lens assembly can include, in order from an imaged object (not shown in drawings) to an image surface IMG, a first optical axis OA1, the light path folding element LF, a second optical axis OA2 and a light filter FL, wherein the light path folding element LF is disposed between the imaged object and a lens group LG of the optical lens assembly, and the plane of incidence and the exit plane of the light path folding element LF can be planar as shown in FIG. 16A or be curved as shown in FIG. 16B. Further, FIG. 16C is a schematic view of an arrangement of two light path folding elements LF1, LF2 in an optical lens assembly of the present disclosure, and FIG. 16D is a schematic view of another arrangement of the two light path folding elements LF1, LF2 in the optical lens assembly of the present disclosure. As shown in FIG. 16C and FIG. 16D, the optical lens assembly also can include, in order from an imaged object (not shown in drawings) to an image surface IMG, a first optical axis OA1, the light path folding element LF1, a second optical axis OA2, the light path folding element LF2, a light filter FL and a third optical axis OA3, wherein the light path folding element LF1 is disposed between the imaged object and a lens group LG of the optical lens assembly, and the light path folding element LF2 is disposed between the lens group LG of the optical lens assembly and the image surface IMG. The light path folding element LF2 can be a prism as shown in FIG. 16C or a mirror as shown in FIG. 16D. Furthermore, FIG. 16E is a schematic view of further another arrangement of a light path folding element LF in an optical lens assembly of the present disclosure. As shown in FIG. 16E, the optical lens assembly also can include, in order from an imaged object (not shown in drawings) to an image surface IMG, a first optical axis OA1, a light filter FL, the light path folding element LF, a second optical axis OA2 and a third optical axis OA3, wherein the light path folding element LF is disposed between a lens group LG of the optical lens assembly and the image surface IMG, and the light path can be folded twice in the light path folding element LF as shown in FIG. 16E. Moreover, the optical lens assembly can also be selectively disposed with three or more light path folding elements, and the type, amount and location of the light path folding elements will not be limited to the present disclosure.

In the present disclosure, the optical lens assembly can be applied in 3D (three-dimensional) image capturing applications, digital cameras, mobile devices, digital tablets, smart TVs, surveillance systems, motion sensing input devices, driving recording systems, rearview camera systems, wearable devices, unmanned aerial vehicles, or other electronic devices.

Each of the aforementioned features of the present disclosure can be utilized in numerous combinations, so as to achieve the corresponding functionality.

According to more another embodiment of the present disclosure, an electronic device is provided, wherein the electronic device includes the aforementioned imaging apparatus. Therefore, it is favorable for enhancing the image quality. Moreover, the electronic device can further include a control unit, a display, a storage unit, a random access memory unit (RAM) or a combination thereof.

According to the above description of the present disclosure, the following specific embodiments are provided for further explanation.

Comparative Example 1

FIG. 1 is a surface diagram of a substrate according to Comparative example 1. A surface of a substrate of Comparative example 1 includes a reflection layer, and the reflection layer includes, in order from the surface of the substrate upwards, a rough layer and a nanocrystalline particle, wherein a layer of glue is applied on the reflection layer, and the nanocrystalline particle is disposed between the rough layer and the glue. In particular, the substrate used of the reflection layer in Comparative example 1 can be any one of the optical lens elements, any one of the optical elements or any one of the carriers according to the present disclosure. As shown in FIG. 1, because the surface of the substrate of Comparative example 1 is without the low reflection layer of the present disclosure, the surface of the upper area of the substrate is highly reflective due to the glue.

In Comparative example 1, the nanocrystalline particle is a multi-layer structure, and the details of each of the layers of the reflection layer in Comparative example 1 are shown in Table 1A.

TABLE 1A

| Layers | Material | Refractive index | Thickness (nm) |
| --- | --- | --- | --- |
| Substrate | — | — | — |
| 1 | Rough layer | — | — |
| 2 | $SiO_2$ | 1.46 | 70.0 |
| 3 | $TiO_2$ | 2.33 | 19.3 |
| 4 | $SiO_2$ | 1.46 | 26.6 |
| 5 | $TiO_2$ | 2.33 | 73.2 |
| 6 | $SiO_2$ | 1.46 | 9.0 |
| 7 | $TiO_2$ | 2.33 | 43.2 |
| 8 | $SiO_2$ | 1.46 | 98.7 |
| 9 | Glue | — | — |
| Height of nanocrystalline particle Tc (nm) | | 340.0 | |

Figure 2:
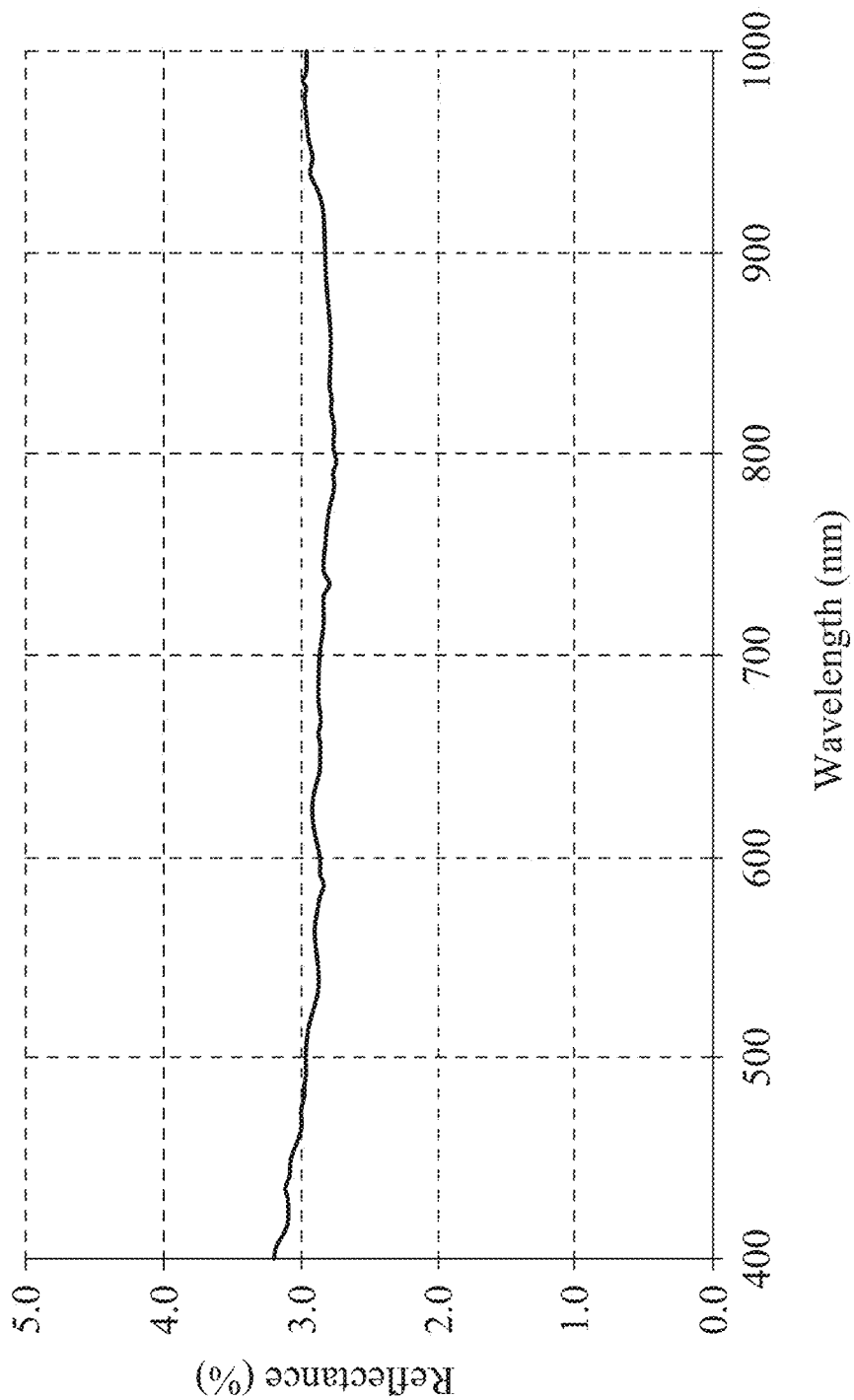
FIG. 2 is a relationship diagram between the reflectance and the wavelengths of a surface including a reflection layer of Comparative example 1.

Reference is made to FIG. 2 and Table 1B simultaneously, FIG. 2 is a relationship diagram between the reflectance and the wavelengths of a surface including the reflection layer of Comparative example 1, and Table 1B shows the values of the reflectance in a wavelength range of 400 nm-1000 nm of the surface including the reflection layer in Comparative example 1.

TABLE 1B

| Wavelength (nm) | Reflectance |
|---|---|
| 400 | 3.19 |
| 405 | 3.18 |
| 410 | 3.16 |
| 415 | 3.11 |
| 420 | 3.09 |
| 425 | 3.09 |
| 430 | 3.10 |
| 435 | 3.11 |
| 440 | 3.09 |
| 445 | 3.08 |
| 450 | 3.07 |
| 455 | 3.05 |
| 460 | 3.02 |
| 465 | 2.99 |
| 470 | 2.99 |
| 475 | 2.99 |
| 480 | 2.98 |
| 485 | 2.98 |
| 490 | 2.97 |
| 495 | 2.96 |
| 500 | 2.96 |
| 505 | 2.96 |
| 510 | 2.95 |
| 515 | 2.94 |
| 520 | 2.92 |
| 525 | 2.91 |
| 530 | 2.89 |
| 535 | 2.87 |
| 540 | 2.86 |
| 545 | 2.87 |
| 550 | 2.88 |
| 555 | 2.89 |
| 560 | 2.90 |
| 565 | 2.89 |
| 570 | 2.88 |
| 575 | 2.86 |
| 580 | 2.85 |
| 585 | 2.84 |
| 590 | 2.86 |
| 595 | 2.86 |
| 600 | 2.86 |
| 605 | 2.88 |
| 610 | 2.89 |
| 615 | 2.91 |
| 620 | 2.91 |
| 625 | 2.91 |
| 630 | 2.91 |
| 635 | 2.90 |
| 640 | 2.88 |
| 645 | 2.86 |
| 650 | 2.85 |
| 655 | 2.85 |
| 660 | 2.86 |
| 665 | 2.86 |
| 670 | 2.86 |
| 675 | 2.86 |
| 680 | 2.86 |
| 685 | 2.87 |
| 690 | 2.87 |
| 695 | 2.87 |
| 700 | 2.87 |
| 705 | 2.86 |
| 710 | 2.85 |
| 715 | 2.84 |
| 720 | 2.83 |
| 725 | 2.83 |
| 730 | 2.83 |
| 735 | 2.80 |
| 740 | 2.83 |
| 745 | 2.83 |
| 750 | 2.83 |
| 755 | 2.82 |
| 760 | 2.82 |
| 765 | 2.80 |
| 770 | 2.80 |
| 775 | 2.78 |
| 780 | 2.77 |
| 785 | 2.76 |
| 790 | 2.76 |
| 795 | 2.75 |
| 800 | 2.75 |
| 805 | 2.76 |
| 810 | 2.75 |
| 815 | 2.76 |
| 820 | 2.77 |
| 825 | 2.77 |
| 830 | 2.78 |
| 835 | 2.78 |
| 840 | 2.78 |
| 845 | 2.78 |
| 850 | 2.78 |
| 855 | 2.78 |
| 860 | 2.79 |
| 865 | 2.79 |
| 870 | 2.80 |
| 875 | 2.80 |
| 880 | 2.81 |
| 885 | 2.81 |
| 890 | 2.82 |
| 895 | 2.82 |
| 900 | 2.83 |
| 905 | 2.83 |
| 910 | 2.83 |
| 915 | 2.84 |
| 920 | 2.85 |
| 925 | 2.87 |
| 930 | 2.88 |
| 935 | 2.90 |
| 940 | 2.93 |
| 945 | 2.91 |
| 950 | 2.92 |
| 955 | 2.94 |
| 960 | 2.96 |
| 965 | 2.96 |
| 970 | 2.97 |
| 975 | 2.97 |
| 980 | 2.97 |
| 985 | 2.97 |
| 990 | 2.96 |
| 995 | 2.97 |
| 1000 | 2.97 |

Table 1C shows the values of R4060, R4070, R5060, R5070, R40100, R70100, R80100 and R90100 of the surface including the reflection layer in Comparative example 1, wherein R4060 is a reflectance in a wavelength range of 400 nm-600 nm of the surface including the low reflection layer, R4070 is a reflectance in a wavelength range of 400 nm-700 nm of the surface including the low reflection layer, R5060 is a reflectance in a wavelength range of 500 nm-600 nm of the surface including the low reflection layer, R5070 is a reflectance in a wavelength range of 500 nm-700 nm of the surface including the low reflection layer, R40100 is a reflectance in a wavelength range of 400 nm-1000 nm of the surface including the low reflection layer, R70100 is a reflectance in a wavelength range of 700 nm-1000 nm of the surface including the low reflection layer, R80100 a reflectance in a wavelength range of 800 nm-1000 nm of the surface including the low reflection layer, and R90100 is a reflectance in a wavelength range of 900 nm-1000 nm of the surface including the low reflection layer. Further, if the definitions of parameters shown in tables of the following comparative examples or examples are the same as those shown in Table 1C, those will not be described again.

TABLE 1C

| R4060 | 2.97 | R40100 | 2.89 |
|---|---|---|---|
| R4070 | 2.94 | R70100 | 2.84 |

TABLE 1C-continued

| | | | |
|---|---|---|---|
| R5060 | 2.89 | R80100 | 2.85 |
| R5070 | 2.88 | R90100 | 2.92 |

Comparative Example 2

A surface of a substrate of Comparative example 2 includes a reflection layer, and the reflection layer includes, in order from the surface of the substrate upwards, a rough layer and a nanocrystalline particle, wherein a layer of glue is applied on the reflection layer, and the nanocrystalline particle is disposed between the rough layer and the glue. In particular, the substrate used of the reflection layer in Comparative example 2 can be any one of the optical lens elements, any one of the optical elements or any one of the carriers according to the present disclosure.

In Comparative example 2, the nanocrystalline particle is a multi-layer structure, and the details of each of the layers of the reflection layer in Comparative example 2 are shown in Table 2A.

TABLE 2A

| Layers | Material | Refractive index | Thickness (nm) |
|---|---|---|---|
| Substrate | — | — | — |
| 1 | Rough layer | — | — |
| 2 | $SiO_2$ | 1.46 | 70.0 |
| 3 | $SiO_2$ | 1.46 | 190.0 |
| 4 | Glue | — | — |
| Height of nanocrystalline particle Tc (nm) | | 260.0 | |

Figure 3:
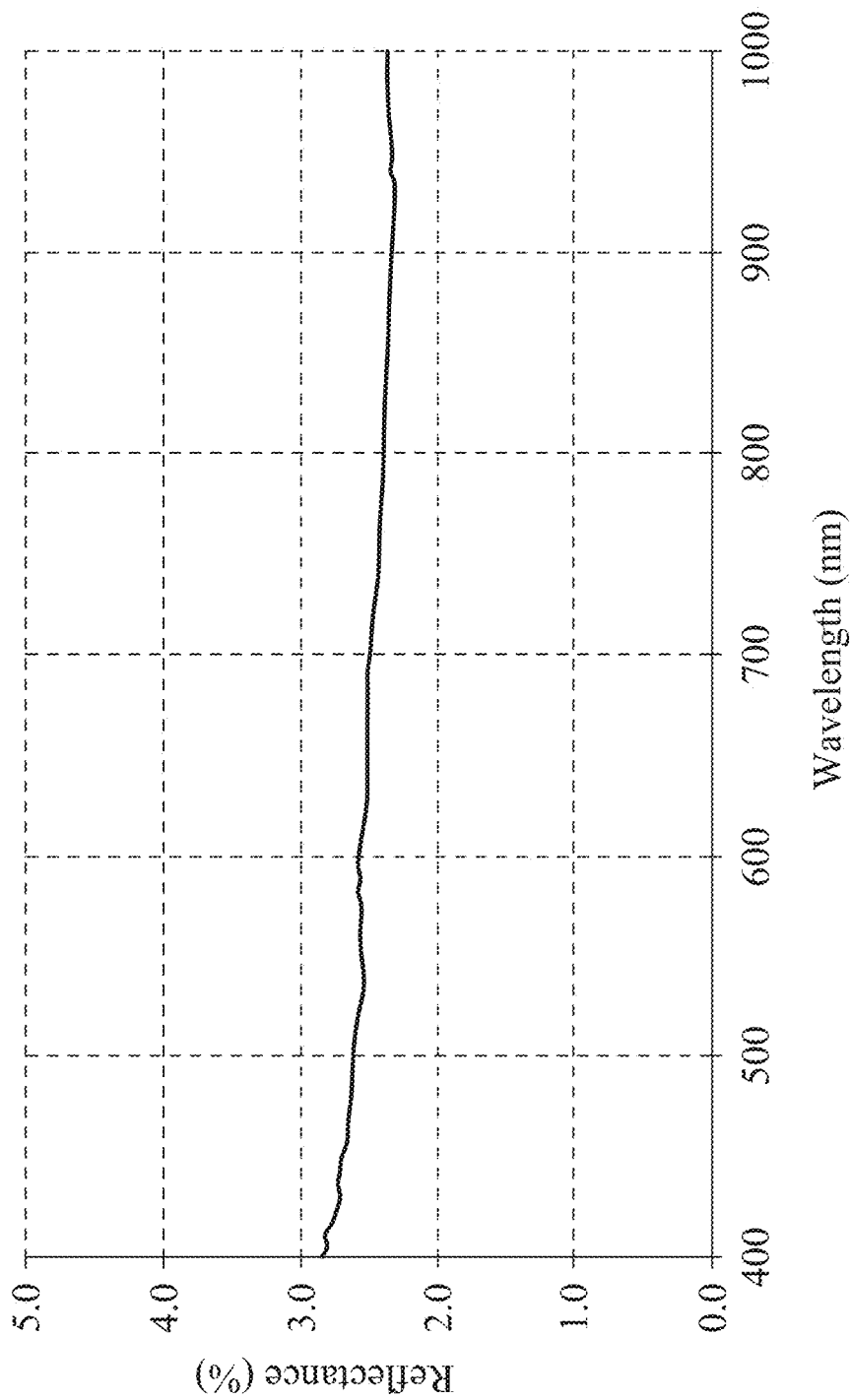
FIG. 3 is a relationship diagram between the reflectance and the wavelengths of a surface including a reflection layer of Comparative example 2.

Reference is made to FIG. 3 and Table 2B simultaneously, FIG. 3 is a relationship diagram between the reflectance and the wavelengths of a surface including a reflection layer of Comparative example 2, and Table 2B shows the values of the reflectance in a wavelength range of 400 nm-1000 nm of the surface including the reflection layer in Comparative example 2.

TABLE 2B

| Wavelength (nm) | Reflectance |
|---|---|
| 400 | 2.82 |
| 405 | 2.81 |
| 410 | 2.81 |
| 415 | 2.77 |
| 420 | 2.75 |
| 425 | 2.72 |
| 430 | 2.71 |
| 435 | 2.72 |
| 440 | 2.71 |
| 445 | 2.70 |
| 450 | 2.68 |
| 455 | 2.67 |
| 460 | 2.66 |
| 465 | 2.65 |
| 470 | 2.64 |
| 475 | 2.63 |
| 480 | 2.63 |
| 485 | 2.62 |
| 490 | 2.62 |
| 495 | 2.62 |
| 500 | 2.61 |
| 505 | 2.60 |
| 510 | 2.58 |
| 515 | 2.57 |
| 520 | 2.55 |
| 525 | 2.54 |

TABLE 2B-continued

| Wavelength (nm) | Reflectance |
|---|---|
| 530 | 2.54 |
| 535 | 2.53 |
| 540 | 2.54 |
| 545 | 2.54 |
| 550 | 2.54 |
| 555 | 2.55 |
| 560 | 2.55 |
| 565 | 2.56 |
| 570 | 2.56 |
| 575 | 2.56 |
| 580 | 2.57 |
| 585 | 2.55 |
| 590 | 2.57 |
| 595 | 2.57 |
| 600 | 2.56 |
| 605 | 2.55 |
| 610 | 2.55 |
| 615 | 2.54 |
| 620 | 2.53 |
| 625 | 2.52 |
| 630 | 2.51 |
| 635 | 2.51 |
| 640 | 2.50 |
| 645 | 2.50 |
| 650 | 2.50 |
| 655 | 2.50 |
| 660 | 2.50 |
| 665 | 2.50 |
| 670 | 2.50 |
| 675 | 2.50 |
| 680 | 2.50 |
| 685 | 2.50 |
| 690 | 2.50 |
| 695 | 2.49 |
| 700 | 2.49 |
| 705 | 2.48 |
| 710 | 2.47 |
| 715 | 2.47 |
| 720 | 2.47 |
| 725 | 2.46 |
| 730 | 2.44 |
| 735 | 2.43 |
| 740 | 2.43 |
| 745 | 2.42 |
| 750 | 2.42 |
| 755 | 2.41 |
| 760 | 2.41 |
| 765 | 2.41 |
| 770 | 2.41 |
| 775 | 2.40 |
| 780 | 2.40 |
| 785 | 2.40 |
| 790 | 2.40 |
| 795 | 2.40 |
| 800 | 2.39 |
| 805 | 2.39 |
| 810 | 2.38 |
| 815 | 2.38 |
| 820 | 2.38 |
| 825 | 2.38 |
| 830 | 2.38 |
| 835 | 2.38 |
| 840 | 2.37 |
| 845 | 2.37 |
| 850 | 2.37 |
| 855 | 2.36 |
| 860 | 2.36 |
| 865 | 2.36 |
| 870 | 2.35 |
| 875 | 2.35 |
| 880 | 2.34 |
| 885 | 2.34 |
| 890 | 2.34 |
| 895 | 2.33 |
| 900 | 2.33 |
| 905 | 2.32 |
| 910 | 2.32 |
| 915 | 2.32 |

TABLE 2B-continued

| Wavelength (nm) | Reflectance |
|---|---|
| 920 | 2.32 |
| 925 | 2.32 |
| 930 | 2.32 |
| 935 | 2.32 |
| 940 | 2.34 |
| 945 | 2.32 |
| 950 | 2.33 |
| 955 | 2.33 |
| 960 | 2.34 |
| 965 | 2.35 |
| 970 | 2.35 |
| 975 | 2.34 |
| 980 | 2.35 |
| 985 | 2.36 |
| 990 | 2.35 |
| 995 | 2.35 |
| 1000 | 2.35 |

Table 2C shows the values of R4060, R4070, R5060, R5070, R40100, R70100, R80100 and R90100 of the surface of the surface including the reflection layer in Comparative example 2.

TABLE 2C

| R4060 | 2.63 | R40100 | 2.48 |
|---|---|---|---|
| R4070 | 2.59 | R70100 | 2.38 |
| R5060 | 2.56 | R80100 | 2.35 |
| R5070 | 2.53 | R90100 | 2.33 |

Example 1

Figure 4:
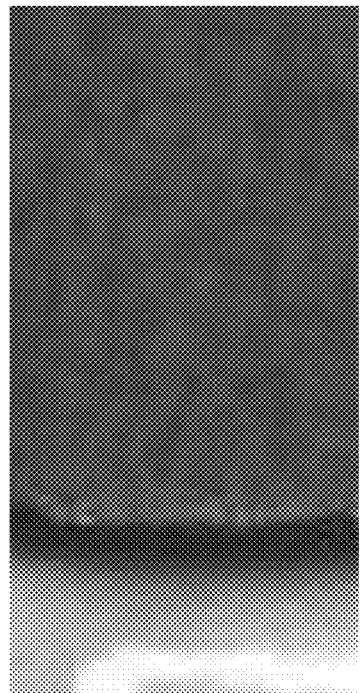
FIG. 4 is a surface diagram of a substrate according to Example 1 of the present disclosure.

FIG. 4 is a surface diagram of a substrate according to Example 1 of the present disclosure. A surface of the substrate of Example 1 includes a low reflection layer, and the low reflection layer includes, in order from the surface of the substrate upwards, a rough layer, a nanocrystalline particle and a hydrophobic layer, wherein a layer of glue is applied on the low reflection layer, and the nanocrystalline particle is disposed between the rough layer and the hydrophobic layer. In particular, the substrate used of the low reflection layer in Example 1 can be any one of the optical lens elements, any one of the optical elements or any one of the carriers according to the present disclosure. As shown in FIG. 4, the surface of the substrate of Example 1 can effectively maintain the appearance blackness and ultra-low reflectivity.

In Example 1, the nanocrystalline particle is a multi-layer structure, and the details of each of the layers of the low reflection layer in Example 1 are shown in Table 3A.

TABLE 3A

| Layers | Material | Refractive index | Thickness (nm) |
|---|---|---|---|
| Substrate | — | — | — |
| 1 | Rough layer | — | — |
| 2 | SiO$_2$ | 1.46 | 70.0 |
| 3 | TiO$_2$ | 2.33 | 19.3 |
| 4 | SiO$_2$ | 1.46 | 26.6 |
| 5 | TiO$_2$ | 2.33 | 73.2 |
| 6 | SiO$_2$ | 1.46 | 9.0 |
| 7 | TiO$_2$ | 2.33 | 43.2 |
| 8 | SiO$_2$ | 1.46 | 98.7 |

TABLE 3A-continued

| Layers | Material | Refractive index | Thickness (nm) |
|---|---|---|---|
| 9 | Hydrophobic layer | 1.33 | 5.0 |
| 10 | Glue | — | — |
| Height of nanocrystalline particle Tc (nm) | | | 340.0 |

Figure 5:
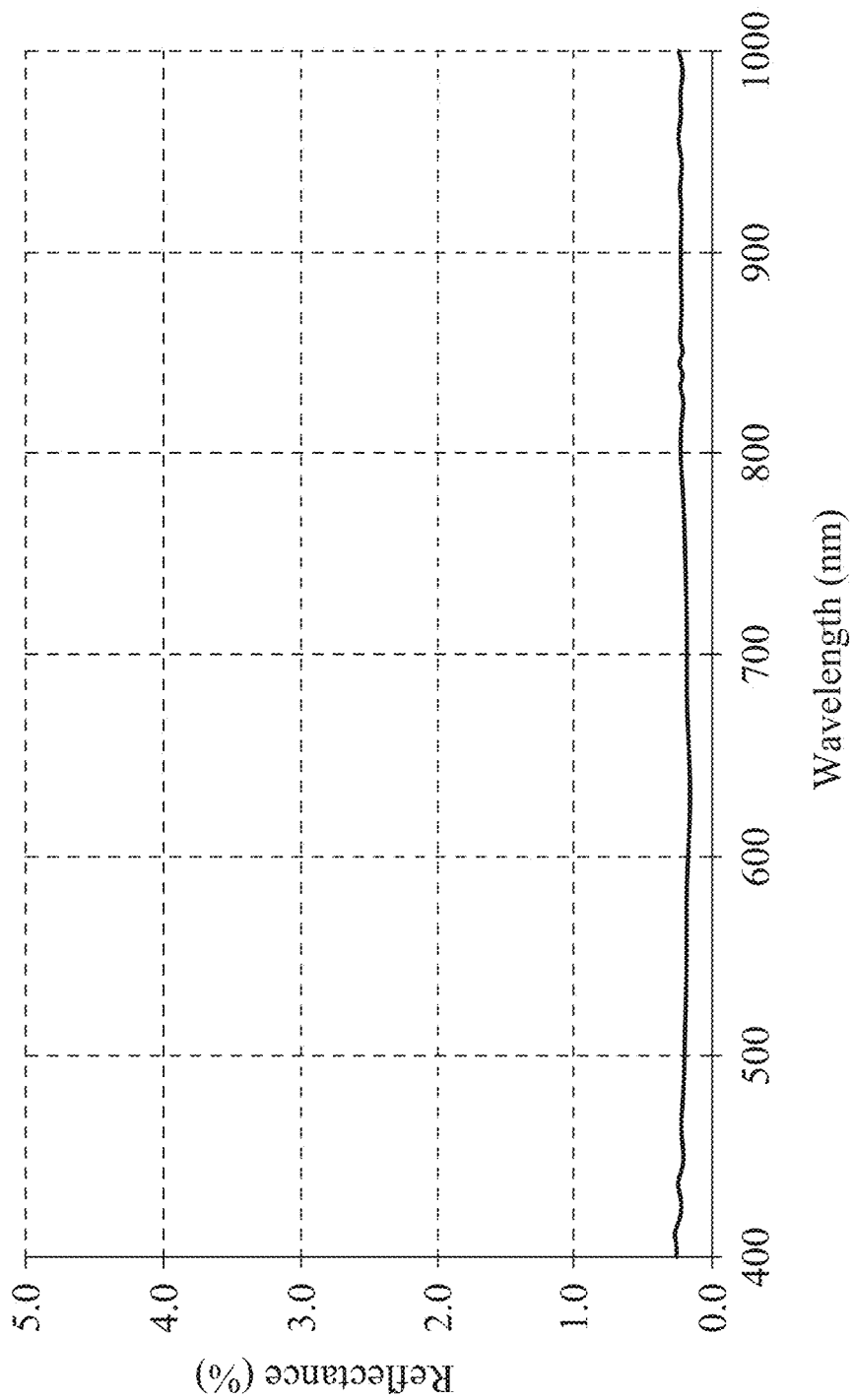
FIG. 5 is a relationship diagram between the reflectance and the wavelengths of a surface including a low reflection layer of Example 1 of the present disclosure.

Reference is made to FIG. 5 and Table 3B simultaneously, FIG. 5 is a relationship diagram between the reflectance and the wavelengths of a surface including a low reflection layer of Example 1 of the present disclosure, and Table 3B shows the values of the reflectance in a wavelength range of 400 nm-1000 nm of the surface including the low reflection layer in Example 1.

TABLE 3B

| Wavelength (nm) | Reflectance |
|---|---|
| 400 | 0.25 |
| 405 | 0.26 |
| 410 | 0.26 |
| 415 | 0.24 |
| 420 | 0.23 |
| 425 | 0.23 |
| 430 | 0.23 |
| 435 | 0.24 |
| 440 | 0.23 |
| 445 | 0.21 |
| 450 | 0.21 |
| 455 | 0.20 |
| 460 | 0.22 |
| 465 | 0.22 |
| 470 | 0.21 |
| 475 | 0.21 |
| 480 | 0.21 |
| 485 | 0.21 |
| 490 | 0.21 |
| 495 | 0.20 |
| 500 | 0.20 |
| 505 | 0.19 |
| 510 | 0.19 |
| 515 | 0.19 |
| 520 | 0.19 |
| 525 | 0.18 |
| 530 | 0.18 |
| 535 | 0.18 |
| 540 | 0.18 |
| 545 | 0.18 |
| 550 | 0.17 |
| 555 | 0.17 |
| 560 | 0.17 |
| 565 | 0.17 |
| 570 | 0.17 |
| 575 | 0.17 |
| 580 | 0.17 |
| 585 | 0.17 |
| 590 | 0.17 |
| 595 | 0.17 |
| 600 | 0.17 |
| 605 | 0.16 |
| 610 | 0.17 |
| 615 | 0.17 |
| 620 | 0.17 |
| 625 | 0.17 |
| 630 | 0.17 |
| 635 | 0.17 |
| 640 | 0.17 |
| 645 | 0.17 |
| 650 | 0.16 |
| 655 | 0.17 |
| 660 | 0.17 |
| 665 | 0.17 |
| 670 | 0.17 |
| 675 | 0.17 |

TABLE 3B-continued

| Wavelength (nm) | Reflectance |
|---|---|
| 680 | 0.17 |
| 685 | 0.17 |
| 690 | 0.18 |
| 695 | 0.17 |
| 700 | 0.17 |
| 705 | 0.18 |
| 710 | 0.18 |
| 715 | 0.18 |
| 720 | 0.18 |
| 725 | 0.18 |
| 730 | 0.18 |
| 735 | 0.19 |
| 740 | 0.19 |
| 745 | 0.19 |
| 750 | 0.19 |
| 755 | 0.19 |
| 760 | 0.19 |
| 765 | 0.19 |
| 770 | 0.20 |
| 775 | 0.20 |
| 780 | 0.20 |
| 785 | 0.20 |
| 790 | 0.20 |
| 795 | 0.20 |
| 800 | 0.21 |
| 805 | 0.21 |
| 810 | 0.21 |
| 815 | 0.21 |
| 820 | 0.21 |
| 825 | 0.21 |
| 830 | 0.21 |
| 835 | 0.22 |
| 840 | 0.21 |
| 845 | 0.22 |
| 850 | 0.21 |
| 855 | 0.22 |
| 860 | 0.22 |
| 865 | 0.22 |
| 870 | 0.22 |
| 875 | 0.22 |
| 880 | 0.22 |
| 885 | 0.22 |
| 890 | 0.22 |
| 895 | 0.22 |
| 900 | 0.22 |
| 905 | 0.22 |
| 910 | 0.22 |
| 915 | 0.22 |
| 920 | 0.22 |
| 925 | 0.22 |
| 930 | 0.23 |
| 935 | 0.23 |
| 940 | 0.23 |
| 945 | 0.22 |
| 950 | 0.22 |
| 955 | 0.23 |
| 960 | 0.23 |
| 965 | 0.23 |
| 970 | 0.22 |
| 975 | 0.23 |
| 980 | 0.23 |
| 985 | 0.22 |
| 990 | 0.22 |
| 995 | 0.22 |
| 1000 | 0.23 |

Table 3C shows the values of R4060, R4070, R5060, R5070, R40100, R70100, R80100 and R90100 of the surface including the low reflection layer in Example 1.

TABLE 3C

| | | | |
|---|---|---|---|
| R4060 | 0.20 | R40100 | 0.20 |
| R4070 | 0.19 | R70100 | 0.21 |
| R5060 | 0.18 | R80100 | 0.22 |
| R5070 | 0.17 | R90100 | 0.22 |

Example 2

A surface of a substrate of Example 2 includes a low reflection layer, the low reflection layer includes, in order from the surface of the substrate upwards, a rough layer, a nanocrystalline particle and a hydrophobic layer, and the nanocrystalline particle is disposed between the rough layer and the hydrophobic layer. In particular, the substrate used of the low reflection layer in Example 2 can be any one of the optical lens elements, any one of the optical elements or any one of the carriers according to the present disclosure.

In Example 2, the nanocrystalline particle is a multi-layer structure, and the details of each of the layers of the low reflection layer in Example 2 are shown in Table 4A.

TABLE 4A

| Layers | Material | Refractive index | Thickness (nm) |
|---|---|---|---|
| Substrate | — | — | — |
| 1 | Rough layer | — | — |
| 2 | $SiO_2$ | 1.46 | 70.0 |
| 3 | $TiO_2$ | 2.33 | 19.3 |
| 4 | $SiO_2$ | 1.46 | 26.6 |
| 5 | $TiO_2$ | 2.33 | 73.2 |
| 6 | $SiO_2$ | 1.46 | 9.0 |
| 7 | $TiO_2$ | 2.33 | 43.2 |
| 8 | $SiO_2$ | 1.46 | 98.7 |
| 9 | Hydrophobic layer | 1.33 | 5.0 |
| Height of nanocrystalline particle Tc (nm) | | | 340.0 |

Figure 6:
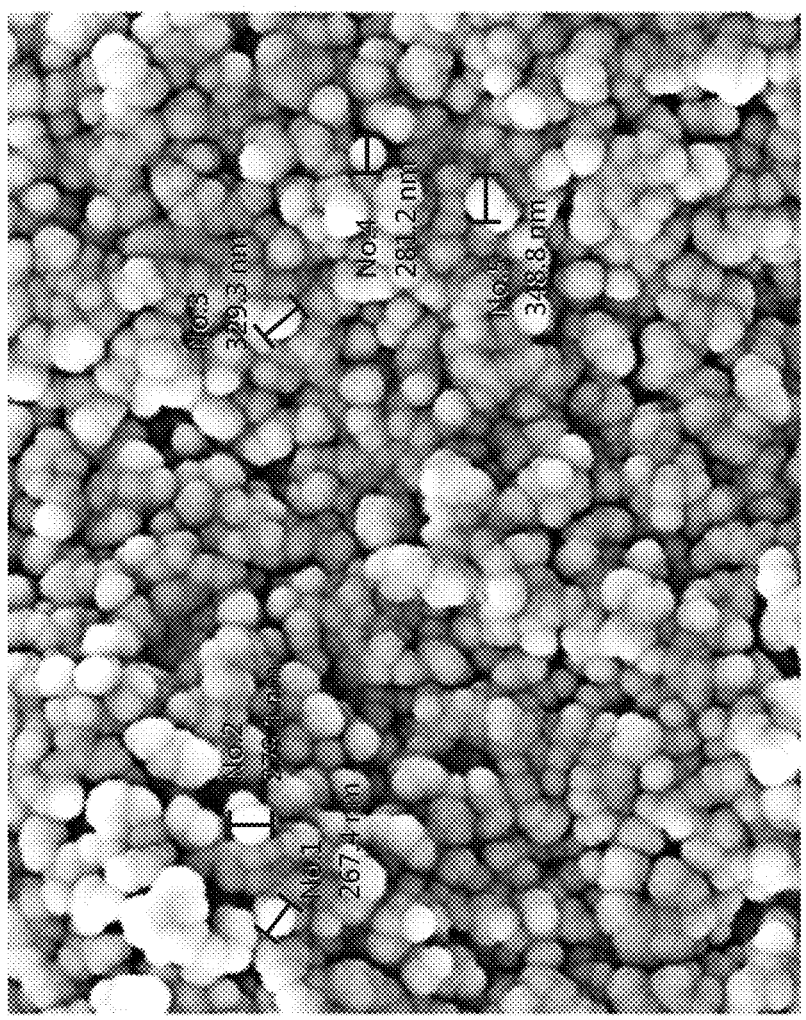
FIG. 6 is a surface diagram of crystalline particles according to Example 2 of the present disclosure.

Reference is made to FIG. 6 and Table 4B simultaneously, FIG. 6 is a surface diagram of crystalline particles according to Example 2 of the present disclosure, and Table 4B shows the values of diameters of the nanocrystalline particles in Example 2.

TABLE 4B

| | Diameter (nm) | Average diameter (nm) |
|---|---|---|
| No. 1 | 267.4 | 301.2 |
| No. 2 | 279.1 | |
| No. 3 | 329.3 | |
| No. 4 | 281.2 | |
| No. 5 | 348.8 | |

Figure 7:
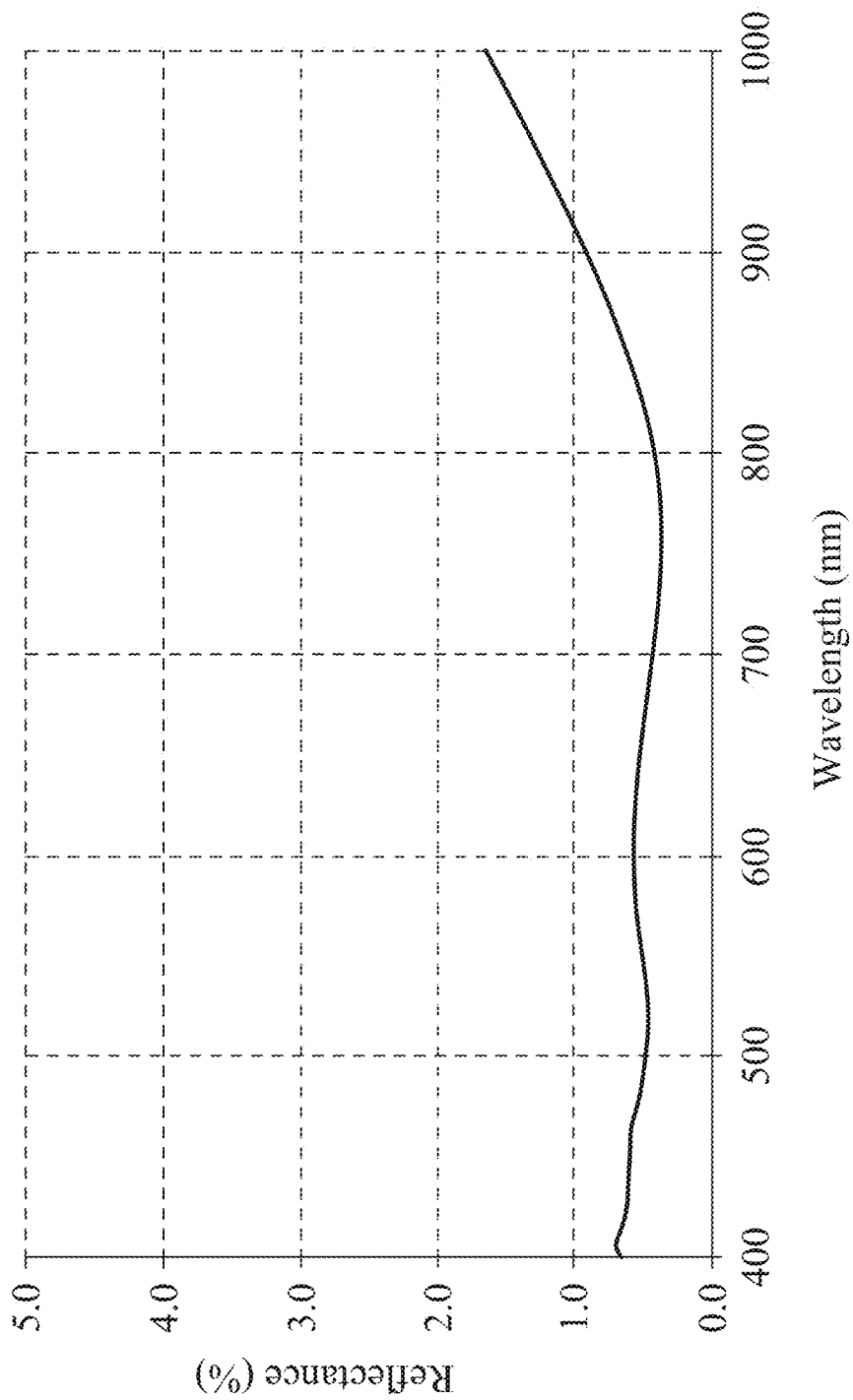
FIG. 7 is a relationship diagram between the reflectance and the wavelengths of a surface including a low reflection layer of Example 2 of the present disclosure.

Reference is made to FIG. 7 and Table 4C simultaneously, FIG. 7 is a relationship diagram between the reflectance and the wavelengths of a surface including a low reflection layer of Example 2 of the present disclosure, and Table 4C shows the values of the reflectance in a wavelength range of 400 nm-1000 nm of the surface including the low reflection layer in Example 2.

TABLE 4C

| Wavelength (nm) | Reflectance |
|---|---|
| 400 | 0.68 |
| 405 | 0.70 |

TABLE 4C-continued

| Wavelength (nm) | Reflectance |
|---|---|
| 410 | 0.70 |
| 415 | 0.67 |
| 420 | 0.64 |
| 425 | 0.63 |
| 430 | 0.62 |
| 435 | 0.62 |
| 440 | 0.61 |
| 445 | 0.60 |
| 450 | 0.60 |
| 455 | 0.60 |
| 460 | 0.61 |
| 465 | 0.59 |
| 470 | 0.56 |
| 475 | 0.55 |
| 480 | 0.53 |
| 485 | 0.52 |
| 490 | 0.51 |
| 495 | 0.50 |
| 500 | 0.49 |
| 505 | 0.48 |
| 510 | 0.48 |
| 515 | 0.48 |
| 520 | 0.47 |
| 525 | 0.48 |
| 530 | 0.48 |
| 535 | 0.49 |
| 540 | 0.50 |
| 545 | 0.50 |
| 550 | 0.51 |
| 555 | 0.53 |
| 560 | 0.54 |
| 565 | 0.55 |
| 570 | 0.55 |
| 575 | 0.56 |
| 580 | 0.57 |
| 585 | 0.57 |
| 590 | 0.57 |
| 595 | 0.57 |
| 600 | 0.57 |
| 605 | 0.57 |
| 610 | 0.57 |
| 615 | 0.57 |
| 620 | 0.57 |
| 625 | 0.56 |
| 630 | 0.56 |
| 635 | 0.56 |
| 640 | 0.55 |
| 645 | 0.54 |
| 650 | 0.53 |
| 655 | 0.52 |
| 660 | 0.52 |
| 665 | 0.51 |
| 670 | 0.50 |
| 675 | 0.48 |
| 680 | 0.47 |
| 685 | 0.46 |
| 690 | 0.46 |
| 695 | 0.44 |
| 700 | 0.43 |
| 705 | 0.43 |
| 710 | 0.42 |
| 715 | 0.41 |
| 720 | 0.40 |
| 725 | 0.40 |
| 730 | 0.39 |
| 735 | 0.39 |
| 740 | 0.38 |
| 745 | 0.38 |
| 750 | 0.37 |
| 755 | 0.37 |
| 760 | 0.38 |
| 765 | 0.38 |
| 770 | 0.38 |
| 775 | 0.38 |
| 780 | 0.39 |
| 785 | 0.40 |
| 790 | 0.41 |
| 795 | 0.42 |
| 800 | 0.43 |
| 805 | 0.44 |
| 810 | 0.46 |
| 815 | 0.47 |
| 820 | 0.49 |
| 825 | 0.51 |
| 830 | 0.53 |
| 835 | 0.56 |
| 840 | 0.58 |
| 845 | 0.60 |
| 850 | 0.62 |
| 855 | 0.65 |
| 860 | 0.68 |
| 865 | 0.70 |
| 870 | 0.73 |
| 875 | 0.76 |
| 880 | 0.79 |
| 885 | 0.83 |
| 890 | 0.86 |
| 895 | 0.89 |
| 900 | 0.92 |
| 905 | 0.96 |
| 910 | 0.99 |
| 915 | 1.02 |
| 920 | 1.06 |
| 925 | 1.10 |
| 930 | 1.14 |
| 935 | 1.17 |
| 940 | 1.21 |
| 945 | 1.24 |
| 950 | 1.28 |
| 955 | 1.32 |
| 960 | 1.36 |
| 965 | 1.40 |
| 970 | 1.43 |
| 975 | 1.47 |
| 980 | 1.51 |
| 985 | 1.55 |
| 990 | 1.58 |
| 995 | 1.62 |
| 1000 | 1.66 |

Table 4D shows the values of R4060, R4070, R5060, R5070, R40100, R70100, R80100 and R90100 of the surface including the low reflection layer in Example 2.

TABLE 4D

| R4060 | 0.56 | R40100 | 0.66 |
| R4070 | 0.55 | R70100 | 0.78 |
| R5060 | 0.52 | R80100 | 0.96 |
| R5070 | 0.52 | R90100 | 1.28 |

Example 3

A surface of a substrate of Example 3 includes a low reflection layer, and the low reflection layer includes, in order from the surface of the substrate upwards, a rough layer, a nanocrystalline particle and a hydrophobic layer, wherein a layer of glue is applied on the low reflection layer, and the nanocrystalline particle is disposed between the rough layer and the hydrophobic layer. In particular, the substrate used of the low reflection layer in Example 3 can be any one of the optical lens elements, any one of the optical elements or any one of the carriers according to the present disclosure.

In Example 3, the nanocrystalline particle is a multi-layer structure, and the details of each of the layers of the low reflection layer in Example 3 are shown in Table 5A.

TABLE 5A

| Layers | Material | Refractive index | Thickness (nm) |
|---|---|---|---|
| Substrate | — | — | — |
| 1 | Rough layer | — | — |
| 2 | SiO$_2$ | 1.46 | 70.0 |
| 3 | SiO$_2$ | 1.46 | 190.0 |
| 4 | Hydrophobic layer | 1.33 | 5.0 |
| 5 | Glue | — | — |
| Height of nanocrystalline particle Tc (nm) | | | 260.0 |

Figure 8:
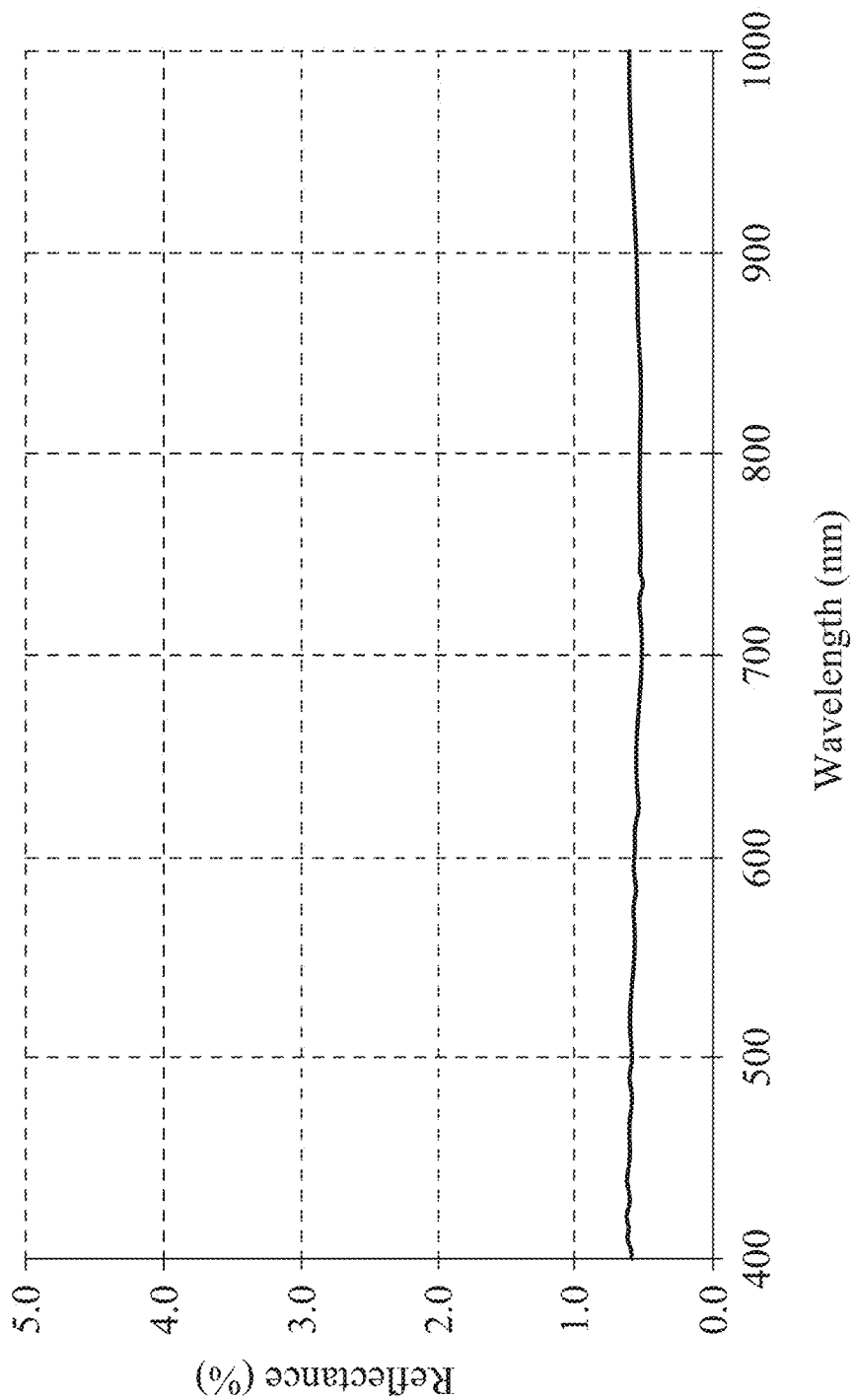
FIG. 8 is a relationship diagram between the reflectance and the wavelengths of a surface including a low reflection layer of Example 3 of the present disclosure.

Reference is made to FIG. 8 and Table 5B simultaneously, FIG. 8 is a relationship diagram between the reflectance and the wavelengths of a surface including a low reflection layer of Example 3 of the present disclosure, and Table 5B shows the values of the reflectance in a wavelength range of 400 nm-1000 nm of the surface including the low reflection layer in Example 3.

TABLE 5B

| Wavelength (nm) | Reflectance |
|---|---|
| 400 | 0.59 |
| 405 | 0.61 |
| 410 | 0.63 |
| 415 | 0.62 |
| 420 | 0.63 |
| 425 | 0.62 |
| 430 | 0.61 |
| 435 | 0.62 |
| 440 | 0.62 |
| 445 | 0.61 |
| 450 | 0.61 |
| 455 | 0.60 |
| 460 | 0.61 |
| 465 | 0.61 |
| 470 | 0.61 |
| 475 | 0.61 |
| 480 | 0.60 |
| 485 | 0.60 |
| 490 | 0.60 |
| 495 | 0.60 |
| 500 | 0.60 |
| 505 | 0.60 |
| 510 | 0.60 |
| 515 | 0.60 |
| 520 | 0.59 |
| 525 | 0.59 |
| 530 | 0.59 |
| 535 | 0.59 |
| 540 | 0.59 |
| 545 | 0.59 |
| 550 | 0.58 |
| 555 | 0.58 |
| 560 | 0.58 |
| 565 | 0.58 |
| 570 | 0.57 |
| 575 | 0.57 |
| 580 | 0.57 |
| 585 | 0.57 |
| 590 | 0.57 |
| 595 | 0.57 |
| 600 | 0.57 |
| 605 | 0.56 |
| 610 | 0.56 |
| 615 | 0.56 |
| 620 | 0.56 |
| 625 | 0.55 |
| 630 | 0.55 |
| 635 | 0.55 |
| 640 | 0.55 |
| 645 | 0.55 |
| 650 | 0.55 |
| 655 | 0.55 |
| 660 | 0.55 |
| 665 | 0.54 |
| 670 | 0.54 |
| 675 | 0.54 |
| 680 | 0.54 |
| 685 | 0.54 |
| 690 | 0.53 |
| 695 | 0.53 |
| 700 | 0.53 |
| 705 | 0.53 |
| 710 | 0.53 |
| 715 | 0.53 |
| 720 | 0.53 |
| 725 | 0.53 |
| 730 | 0.53 |
| 735 | 0.53 |
| 740 | 0.53 |
| 745 | 0.53 |
| 750 | 0.53 |
| 755 | 0.53 |
| 760 | 0.53 |
| 765 | 0.53 |
| 770 | 0.53 |
| 775 | 0.53 |
| 780 | 0.53 |
| 785 | 0.53 |
| 790 | 0.53 |
| 795 | 0.53 |
| 800 | 0.53 |
| 805 | 0.53 |
| 810 | 0.53 |
| 815 | 0.53 |
| 820 | 0.53 |
| 825 | 0.53 |
| 830 | 0.53 |
| 835 | 0.54 |
| 840 | 0.54 |
| 845 | 0.53 |
| 850 | 0.54 |
| 855 | 0.54 |
| 860 | 0.54 |
| 865 | 0.54 |
| 870 | 0.54 |
| 875 | 0.54 |
| 880 | 0.55 |
| 885 | 0.55 |
| 890 | 0.55 |
| 895 | 0.55 |
| 900 | 0.56 |
| 905 | 0.56 |
| 910 | 0.57 |
| 915 | 0.57 |
| 920 | 0.57 |
| 925 | 0.57 |
| 930 | 0.58 |
| 935 | 0.58 |
| 940 | 0.59 |
| 945 | 0.58 |
| 950 | 0.59 |
| 955 | 0.59 |
| 960 | 0.60 |
| 965 | 0.60 |
| 970 | 0.60 |
| 975 | 0.60 |
| 980 | 0.61 |
| 985 | 0.61 |
| 990 | 0.61 |
| 995 | 0.61 |
| 1000 | 0.62 |

Table 5C shows the values of R4060, R4070, R5060, R5070, R40100, R70100, R80100 and R90100 of the surface including the low reflection layer in Example 3.

TABLE 5C

| | | | |
|---|---|---|---|
| R4060 | 0.60 | R40100 | 0.57 |
| R4070 | 0.58 | R70100 | 0.55 |
| R5060 | 0.58 | R80100 | 0.56 |
| R5070 | 0.57 | R90100 | 0.59 |

Example 4

A surface of a substrate of Example 4 includes a low reflection layer, the low reflection layer includes, in order from the surface of the substrate upwards, a rough layer, a nanocrystalline particle and a hydrophobic layer, and the nanocrystalline particle is disposed between the rough layer and the hydrophobic layer. In particular, the substrate used of the low reflection layer in Example 4 can be any one of the optical lens elements, any one of the optical elements or any one of the carriers according to the present disclosure.

In Example 4, the nanocrystalline particle is a multi-layer structure, and the details of each of the layers of the low reflection layer in Example 4 are shown in Table 6A.

TABLE 6A

| Layers | Material | Refractive index | Thickness (nm) |
|---|---|---|---|
| Substrate | — | — | — |
| 1 | Rough layer | — | — |
| 2 | $SiO_2$ | 1.46 | 70.0 |
| 3 | $SiO_2$ | 1.46 | 190.0 |
| 4 | Hydrophobic layer | 1.33 | 5.0 |
| Height of nanocrystalline particle Tc (nm) | | | 260.0 |

Figure 9:
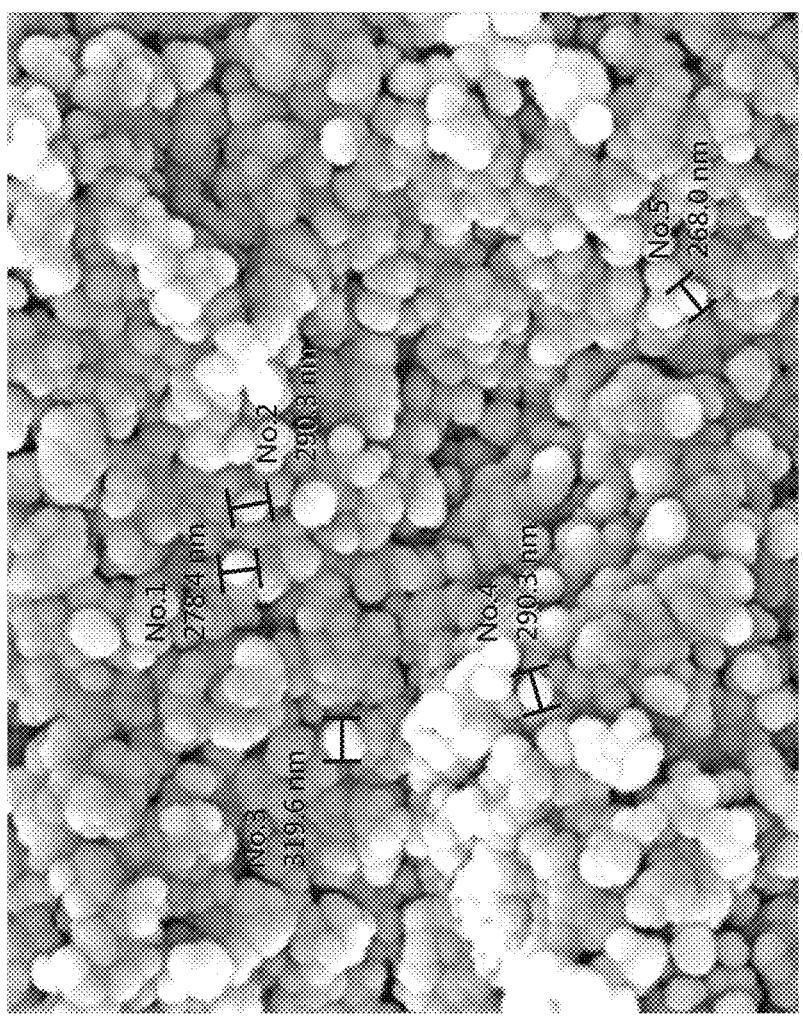
FIG. 9 is a surface diagram of crystalline particles according to Example 4 of the present disclosure.

Reference is made to FIG. 9 and Table 6B simultaneously, FIG. 9 is a surface diagram of crystalline particles according to Example 4 of the present disclosure, and Table 6B shows the values of diameters of the nanocrystalline particles in Example 4.

TABLE 6B

| | Diameter (nm) | Average diameter (nm) |
|---|---|---|
| No. 1 | 278.4 | 289.3 |
| No. 2 | 290.3 | |
| No. 3 | 319.6 | |
| No. 4 | 290.3 | |
| No. 5 | 268.0 | |

Figure 10:
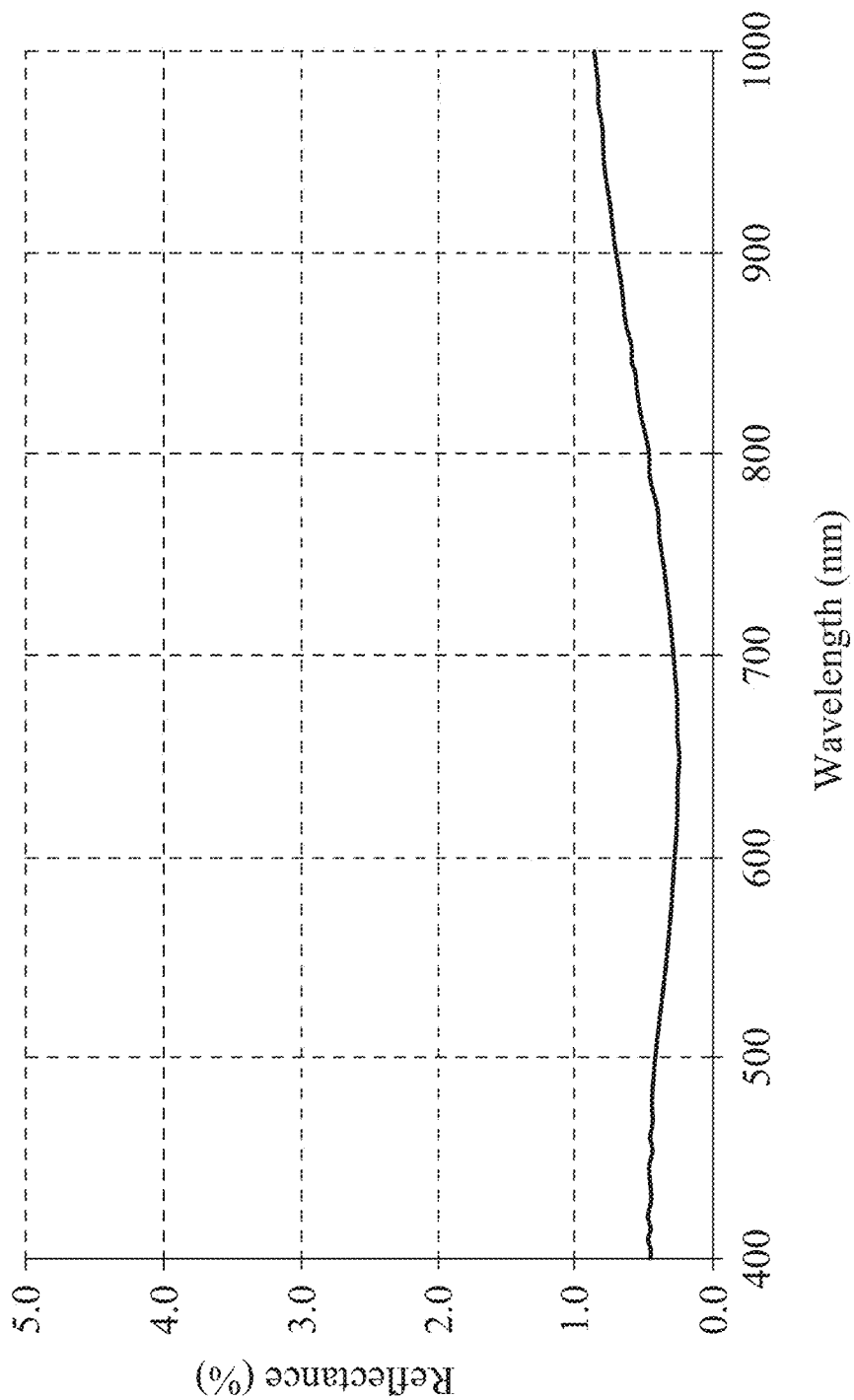
FIG. 10 is a relationship diagram between the reflectance and the wavelengths of a surface including a low reflection layer of Example 4 of the present disclosure.

Reference is made to FIG. 10 and Table 6C, FIG. 10 is a relationship diagram between the reflectance and the wavelengths of a surface including a low reflection layer of Example 4 of the present disclosure, and Table 6C shows the values of the reflectance in a wavelength range of 400 nm-1000 nm of the surface including the low reflection layer in Example 4.

TABLE 6C

| Wavelength (nm) | Reflectance |
|---|---|
| 400 | 0.46 |
| 405 | 0.45 |
| 410 | 0.46 |
| 415 | 0.45 |
| 420 | 0.46 |
| 425 | 0.46 |
| 430 | 0.46 |
| 435 | 0.45 |
| 440 | 0.45 |
| 445 | 0.45 |
| 450 | 0.45 |
| 455 | 0.44 |
| 460 | 0.45 |
| 465 | 0.45 |
| 470 | 0.44 |
| 475 | 0.44 |
| 480 | 0.43 |
| 485 | 0.43 |
| 490 | 0.42 |
| 495 | 0.42 |
| 500 | 0.41 |
| 505 | 0.40 |
| 510 | 0.40 |
| 515 | 0.39 |
| 520 | 0.38 |
| 525 | 0.37 |
| 530 | 0.36 |
| 535 | 0.36 |
| 540 | 0.35 |
| 545 | 0.34 |
| 550 | 0.33 |
| 555 | 0.33 |
| 560 | 0.32 |
| 565 | 0.31 |
| 570 | 0.31 |
| 575 | 0.30 |
| 580 | 0.29 |
| 585 | 0.29 |
| 590 | 0.28 |
| 595 | 0.28 |
| 600 | 0.27 |
| 605 | 0.27 |
| 610 | 0.27 |
| 615 | 0.26 |
| 620 | 0.26 |
| 625 | 0.25 |
| 630 | 0.25 |
| 635 | 0.25 |
| 640 | 0.25 |
| 645 | 0.25 |
| 650 | 0.25 |
| 655 | 0.25 |
| 660 | 0.25 |
| 665 | 0.25 |
| 670 | 0.26 |
| 675 | 0.26 |
| 680 | 0.26 |
| 685 | 0.27 |
| 690 | 0.27 |
| 695 | 0.28 |
| 700 | 0.28 |
| 705 | 0.29 |
| 710 | 0.30 |
| 715 | 0.30 |
| 720 | 0.31 |
| 725 | 0.32 |
| 730 | 0.33 |
| 735 | 0.34 |
| 740 | 0.35 |
| 745 | 0.36 |
| 750 | 0.37 |
| 755 | 0.38 |
| 760 | 0.38 |
| 765 | 0.40 |
| 770 | 0.41 |
| 775 | 0.42 |
| 780 | 0.43 |
| 785 | 0.44 |
| 790 | 0.45 |
| 795 | 0.46 |
| 800 | 0.47 |

TABLE 6C-continued

| Wavelength (nm) | Reflectance |
|---|---|
| 805 | 0.48 |
| 810 | 0.50 |
| 815 | 0.51 |
| 820 | 0.52 |
| 825 | 0.53 |
| 830 | 0.55 |
| 835 | 0.56 |
| 840 | 0.57 |
| 845 | 0.58 |
| 850 | 0.59 |
| 855 | 0.61 |
| 860 | 0.62 |
| 865 | 0.63 |
| 870 | 0.64 |
| 875 | 0.65 |
| 880 | 0.66 |
| 885 | 0.67 |
| 890 | 0.68 |
| 895 | 0.69 |
| 900 | 0.70 |
| 905 | 0.71 |
| 910 | 0.72 |
| 915 | 0.73 |
| 920 | 0.74 |
| 925 | 0.75 |
| 930 | 0.76 |
| 935 | 0.77 |
| 940 | 0.78 |
| 945 | 0.78 |
| 950 | 0.79 |
| 955 | 0.80 |
| 960 | 0.81 |
| 965 | 0.82 |
| 970 | 0.82 |
| 975 | 0.83 |
| 980 | 0.83 |
| 985 | 0.84 |
| 990 | 0.84 |
| 995 | 0.85 |
| 1000 | 0.86 |

Table 6D shows the values of R4060, R4070, R5060, R5070, R40100, R70100, R80100 and R90100 of the surface including the low reflection layer in Example 4.

TABLE 6D

| R4060 | 0.39 | R40100 | 0.47 |
|---|---|---|---|
| R4070 | 0.35 | R70100 | 0.58 |
| R5060 | 0.34 | R80100 | 0.69 |
| R5070 | 0.30 | R90100 | 0.79 |

Example 5

FIG. 11 is a three-dimensional schematic view of an imaging apparatus 100 according to Example 5 of the present disclosure. As shown in FIG. 11, the imaging apparatus 100 of Example 5 is a camera module, and the imaging apparatus 100 includes an optical lens assembly 101, a driving apparatus 102 and an image sensor 103, wherein the optical lens assembly 101 includes the optical lens element and the optical element of the present disclosure, and the imaging apparatus 100 further includes a carrier (the reference number is omitted). The imaging apparatus 100 can focus light from an imaged object via the optical lens assembly 101, perform image focusing by the driving apparatus 102, generate an image on the image sensor 103, and then the imaging information can be output.

The driving apparatus 102 can be an auto-focus module, which can be driven by driving systems, such as voice coil motors (VCM), micro electro-mechanical systems (MEMS), piezoelectric systems, shape memory alloys, etc. The optical lens assembly 101 can obtain a better imaging position by the driving apparatus 102 so as to capture clear images no matter that the imaged object is disposed at different object distances.

The imaging apparatus 100 can include the image sensor 103 located on the image surface of the optical lens assembly 101, such as CMOS and CCD, with superior photosensitivity and low noise. Thus, it is favorable for providing realistic images with high definition image quality thereof. Further, the imaging apparatus 100 can further include an image stabilization module 104, which can be a kinetic energy sensor, such as an accelerometer, a gyro sensor or a Hall Effect sensor. In Example 5, the image stabilization module 104 is a gyro sensor, but it is not limited thereto. Therefore, the variation of different axial directions of the optical lens assembly 101 can be adjusted so as to compensate the image blur generated by the motion at the moment of exposure, so that it is further favorable for enhancing the image quality while photographing in motion and low light situation. Further, advanced image compensation functions, such as optical image stabilizations (OIS), electronic image stabilizations (EIS), etc., can be provided.

Example 6

Figure 12A:
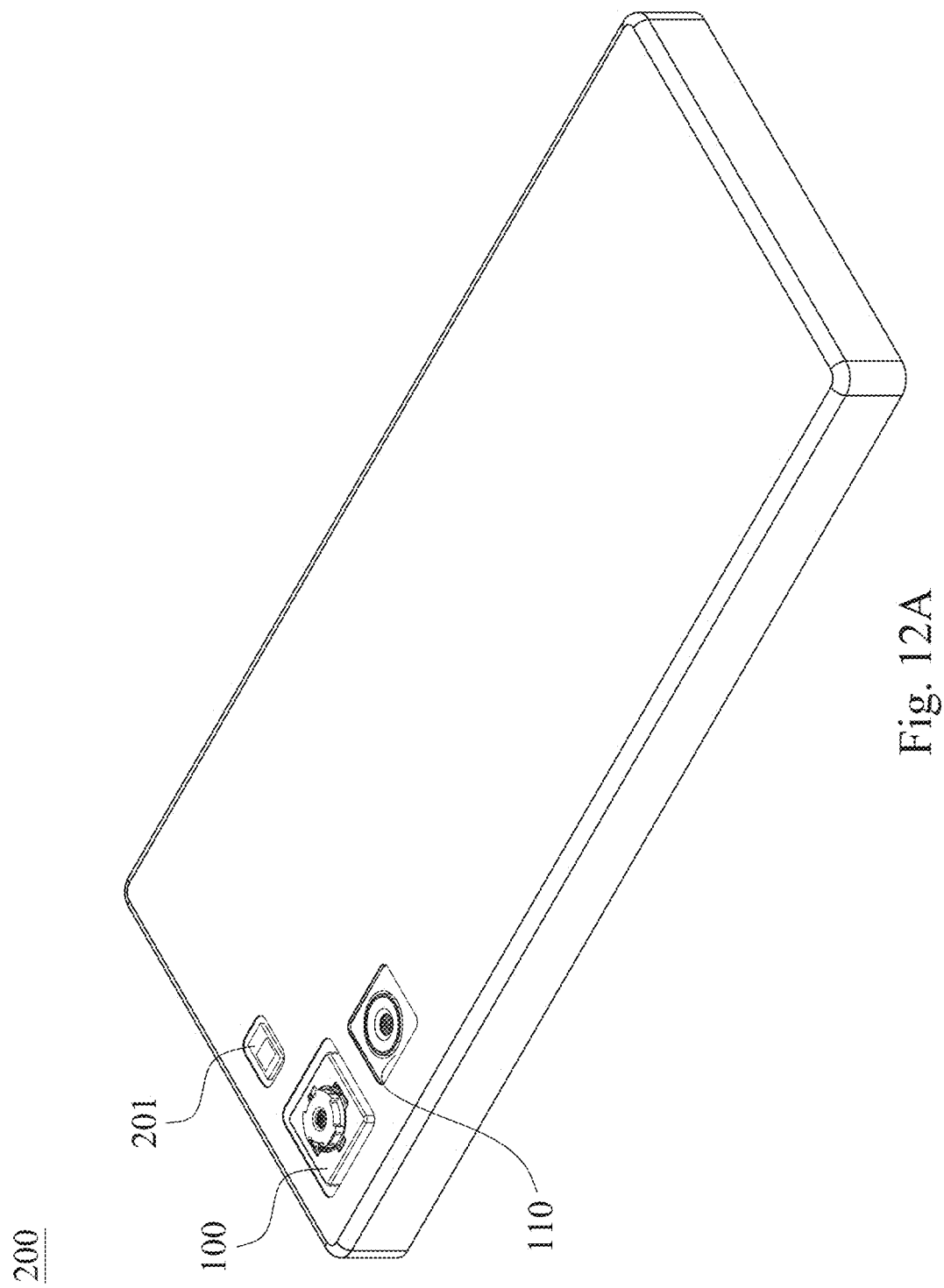
FIG. 12A is a schematic view of one side of an electronic device according to Example 6 of the present disclosure.
Figure 12B:
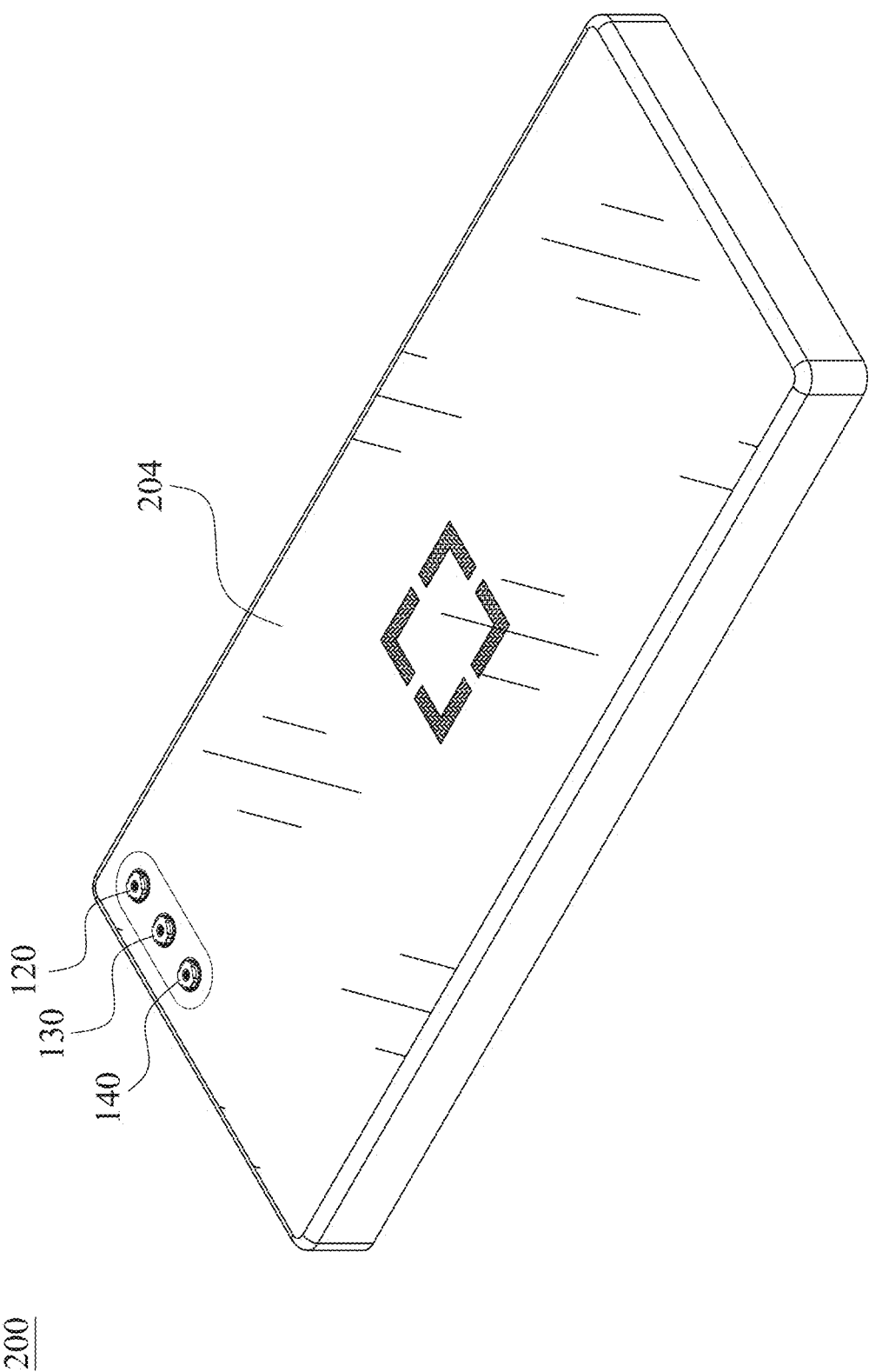
FIG. 12B is a schematic view of another side of the electronic device of FIG. 12A.
Figure 12C:
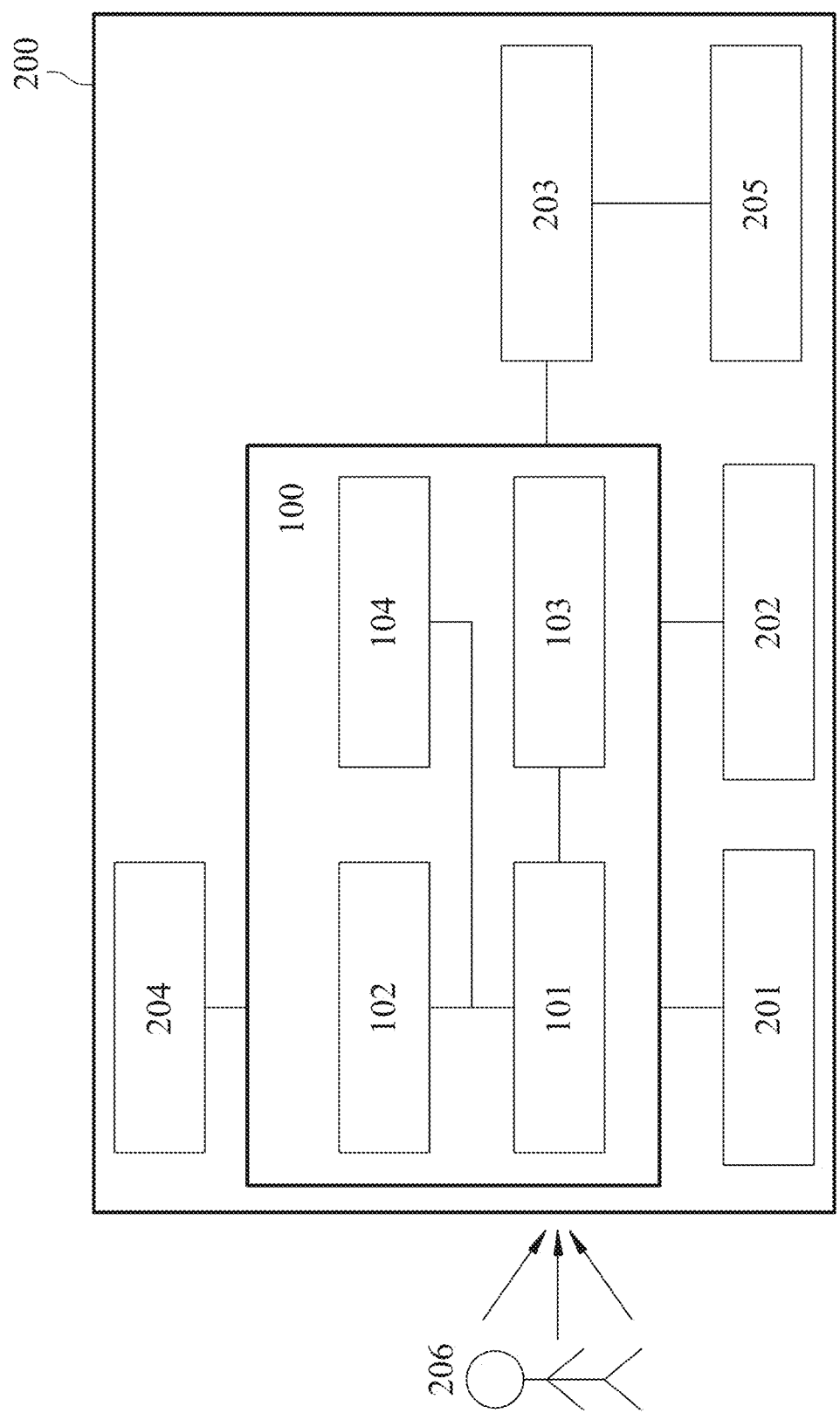
FIG. 12C is a system schematic view of the electronic device of FIG. 12A.

FIG. 12A is a schematic view of one side of an electronic device 200 according to Example 6 of the present disclosure, FIG. 12B is a schematic view of another side of the electronic device 200 of FIG. 12A, and FIG. 12C is a system schematic view of the electronic device 200 of FIG. 12A. As shown in FIG. 12A, FIG. 12B and FIG. 12C, the electronic device 200 of Example 6 is a smartphone, and the electronic device 200 includes imaging apparatuses 100, 110, 120, 130, 140, a flash module 201, a focusing assisting module 202, an image signal processor (ISP) 203, a user interface 204 and an image software processor 205, wherein the imaging apparatuses 120, 130, 140 are respectively a front camera. When the user captures images of an imaged object 206 via the user interface 204, the electronic device 200 focuses and generates an image via at least one of the imaging apparatuses 100, 110, 120, 130, 140. At this time, the flash module 201 is turned on for compensating of the low illumination, and the electronic device 200 quickly focuses on the imaged object 206 according to its object distance information provided by the focusing assisting module 202. Then, the image is optimized via the image signal processor 203 and the image software processor 205, so that the image quality can be further enhanced. The focusing assisting module 202 can adopt conventional infrared or laser for obtaining quick focusing, and the user interface 204 can utilize a touch screen or a physical button for capturing and processing the image with various functions of the image processing software.

At least one of the imaging apparatuses 100, 110, 120, 130, 140 of Example 6 can include the optical lens assembly according to the present disclosure, and the one can have the structures which are the same or similar to that of the imaging apparatus 100 of Example 5, so that the structures will not be described again herein. In detail, the imaging apparatuses 100, 110 of Example 6 can be a wide angle imaging apparatus and an ultra-wide angle imaging apparatus, respectively, or can be a wide angle imaging apparatus and a telephoto imaging apparatus, respectively. The imaging apparatuses 120, 130, 140 can be a wide angle imaging apparatus, an ultra-wide angle imaging apparatus and a TOF (Time-Of-Flight) module, respectively, but the present disclosure is not limited thereto. Further, the connecting relationships between each of the imaging apparatuses 110, 120, 130, 140 and other elements can be the same as that of the imaging apparatus 100 in FIG. 11, or can be adaptively adjusted according to the type of the imaging apparatuses, and the details thereof will not be shown or described again.

Example 7

Figure 13:
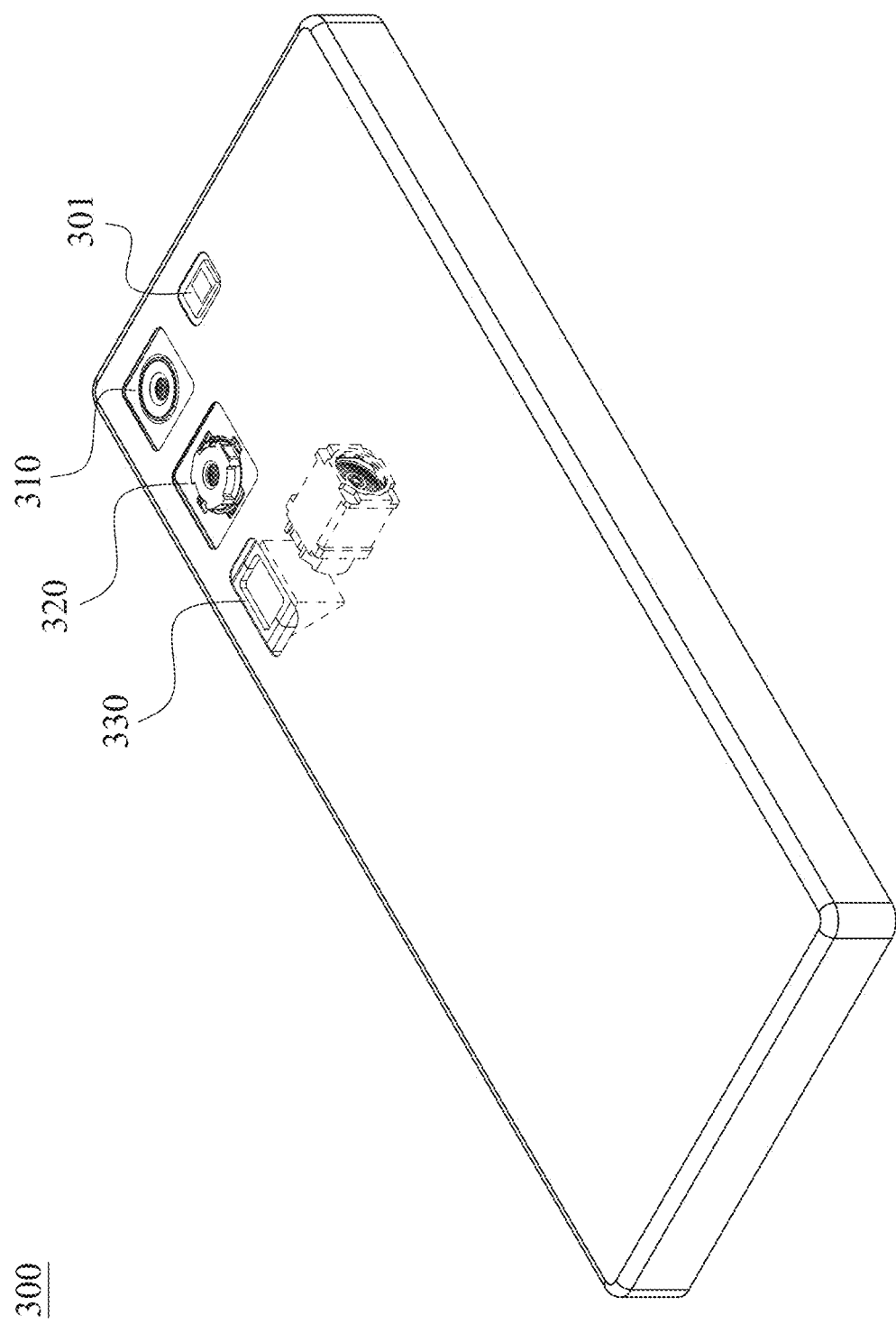
FIG. 13 is a schematic view of one side of an electronic device according to the Example 7 of the present disclosure.

FIG. 13 is a schematic view of one side of an electronic device 300 according to the Example 7 of the present disclosure. The electronic device 300 of Example 7 is a smartphone, and the electronic device includes imaging apparatuses 310, 320, 330 and a flash module 301.

The electronic device 300 of Example 7 can include the elements which are the same or similar to that of Example 6, and the connecting relationships between the imaging apparatuses 310, 320, 330 and other elements also can be the same as that of Example 6, so that the details thereof will not be shown or described again. Each of the imaging apparatuses 310, 320, 330 of Example 7 can include the optical lens assembly according to the present disclosure, and the structures can be the same or similar to that of the imaging apparatus 100 of Example 5, so that the details thereof will not be shown or described again. In detail, the imaging apparatus 310 can be an ultra-wide angle imaging apparatus, the imaging apparatus 320 can be a wide angle imaging apparatus, the imaging apparatus 330 can be a telephoto imaging apparatus (which can include a light path folding element), or can be adaptively adjusted according to the type of the imaging apparatuses, and the present disclosure is not limited thereto.

Example 8

Figure 14:
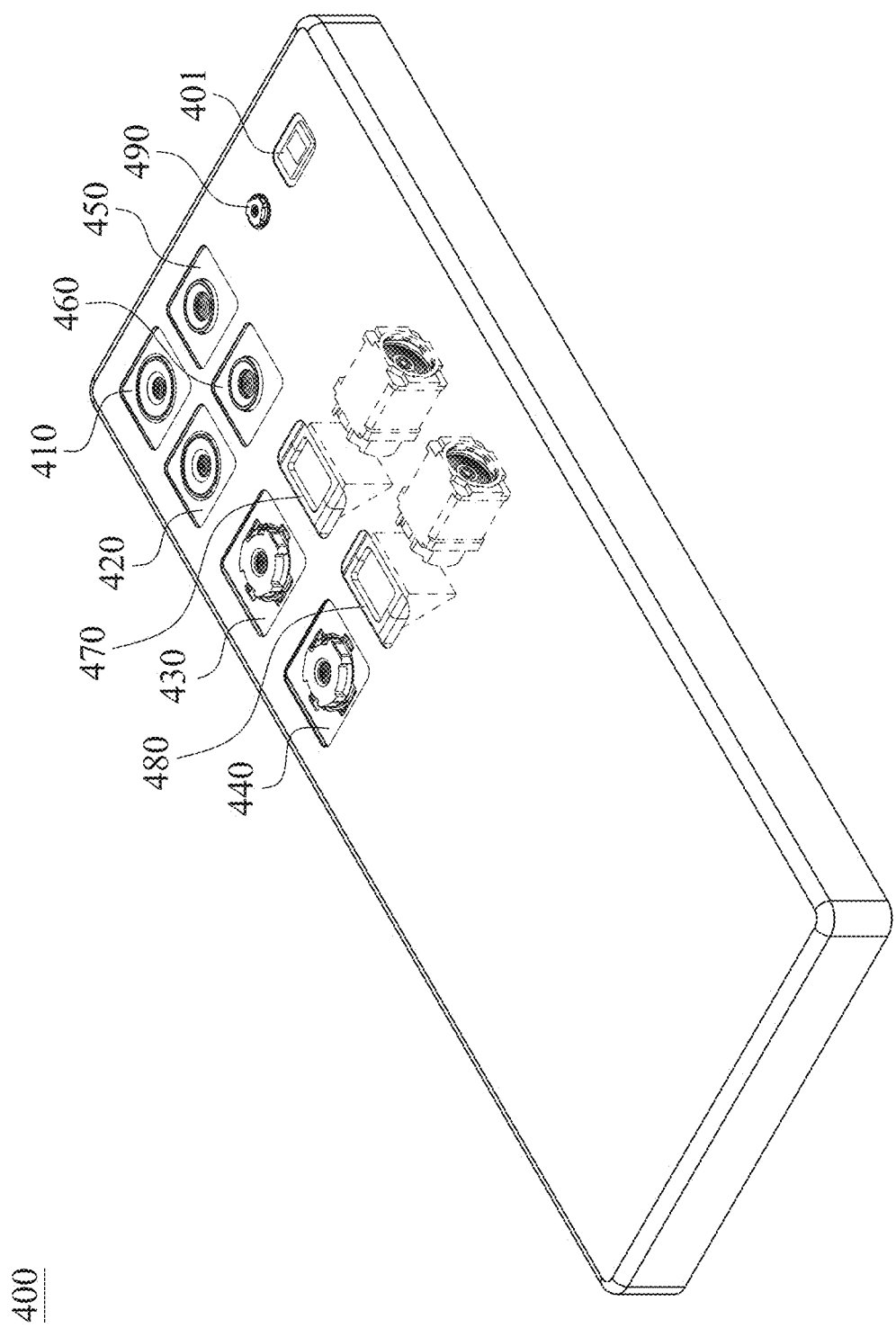
FIG. 14 is a schematic view of one side of an electronic device according to Example 8 of the present disclosure.

FIG. 14 is a schematic view of one side of an electronic device 400 according to Example 8 of the present disclosure. The electronic device 400 of Example 8 is a smartphone, and the electronic device 400 includes imaging apparatuses 410, 420, 430, 440, 450, 460, 470, 480, 490 and a flash module 401.

The electronic device 400 of Example 8 can include the elements which are the same or similar to that of Example 6, and the connecting relationships among the imaging apparatuses 410, 420, 430, 440, 450, 460, 470, 480, 490, the flash module 401 and other elements also can be the same as that of Example 6, so that the details thereof will not be shown or described again. Each of the imaging apparatuses 410, 420, 430, 440, 450, 460, 470, 480, 490 of Example 8 can include the optical lens assembly according to the present disclosure, and the structures can be the same or similar to that of the imaging apparatus 100 of Example 5, so that the details thereof will not be shown or described again.

In detail, the imaging apparatuses 410, 420 can be respectively an ultra-wide angle imaging apparatus, the imaging apparatuses 430, 440 can be respectively a wide angle imaging apparatus, the imaging apparatuses 450, 460 can be respectively a telephoto imaging apparatus, the imaging apparatuses 470, 480 can be respectively a telephoto imaging apparatus (which can include a light path folding element), the imaging apparatus 490 can be a TOF module, or can be adaptively adjusted according to the type of the imaging apparatuses, and the present disclosure is not limited thereto.

Example 9

Figure 15B:
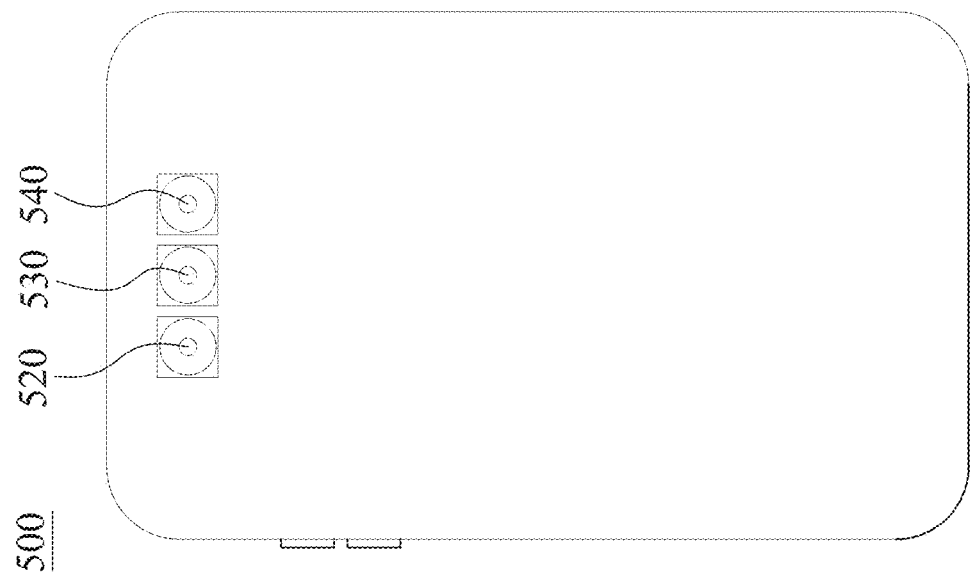
FIG. 15B is a schematic view of another side of the electronic device of FIG. 15A.
Figure 15A:
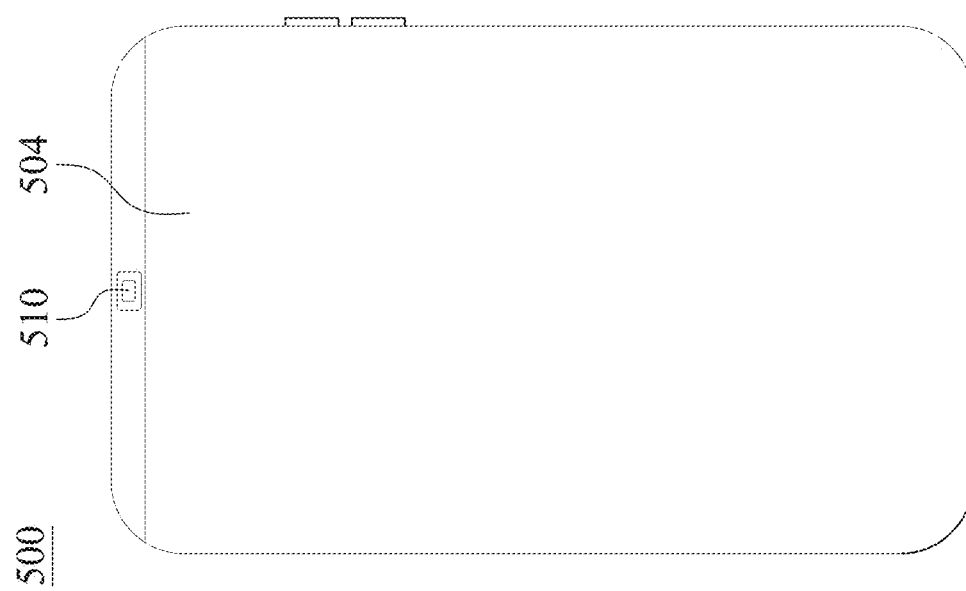
FIG. 15A is a schematic view of one side of an electronic device according to Example 9 of the present disclosure.

FIG. 15A is a schematic view of one side of an electronic device 500 according to Example 9 of the present disclosure, and FIG. 15B is a schematic view of another side of the electronic device 500 of FIG. 15A. As shown in FIG. 15A and FIG. 15B, the electronic device 500 of Example 9 is a smartphone, and the electronic device 500 includes imaging apparatuses 510, 520, 530, 540 and a user interface 504.

The electronic device 500 of Example 9 can include the elements which are the same or similar to that of Example 6, and the connecting relationships among the imaging apparatuses 510, 520, 530, 540, the user interface 504 and other elements also can be the same as that of Example 6, so that the details thereof will not be shown or described again. In detail, the imaging apparatus 510 can correspond to a non-circular opening located on an outer side of the electronic device 500 for capturing the image. The imaging apparatuses 520, 530, 540 can a telephoto imaging apparatus, a wide angle imaging apparatus and an ultra-wide angle imaging apparatus, respectively, or can be other types of the imaging apparatuses, and the present disclosure is not limited thereto.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising:
   at least one optical lens element; and
   at least one optical element;
   wherein at least one surface of the at least one optical lens element or the at least one optical element comprises a low reflection layer, the low reflection layer comprises a rough layer, a nanocrystalline particle and a hydrophobic layer, the nanocrystalline particle is disposed between the rough layer and the hydrophobic layer, and the hydrophobic layer is farther away from the surface of the at least one optical lens element or the at least one optical element than the nanocrystalline particle;
   wherein a material of the nanocrystalline particle at least comprises $SiO_2$;
   wherein an average diameter of the nanocrystalline particle is DC, and the following condition is satisfied:

200 nm<DC<1000 nm.

2. The optical lens assembly of claim 1, wherein a material of the hydrophobic layer is selected from at least one polyurethane compound, a polyimide compound, an organosilane compound, a fluoroalkane compound, a fluoroalkenyl ether polymer, a fluorosilane compound and a fluoroacrylate compound.

3. The optical lens assembly of claim 1, wherein the nanocrystalline particle is a multi-layer structure, and the nanocrystalline particle comprises at least one high refractive index layer and at least one low refractive index layer;

wherein the at least one high refractive index layer and the at least one low refractive index layer are arranged by alternately, the at least one low refractive index layer is closer to the hydrophobic layer than the at least one high refractive index layer, and a main material of the at least one low refractive index layer is $SiO_2$.

4. The optical lens assembly of claim 1, wherein a height of the nanocrystalline particle is Tc, and the following condition is satisfied:

200 nm<Tc<800 nm.

5. The optical lens assembly of claim 1, wherein a reflectance in a wavelength range of 400 nm-1000 nm of the surface comprising the low reflection layer is R40100, and the following condition is satisfied:

0% <R40100≤2.4%.

6. The optical lens assembly of claim 5, wherein a reflectance in a wavelength range of 400 nm-700 nm of the surface comprising the low reflection layer is R4070, and the following condition is satisfied:

0% <R4070≤2.5%.

7. The optical lens assembly of claim 6, wherein a reflectance in a wavelength range of 500 nm-700 nm of the surface comprising the low reflection layer is R5070, and the following condition is satisfied:

0% <R5070≤2.4%.

8. The optical lens assembly of claim 6, wherein a reflectance in a wavelength range of 400 nm-600 nm of the surface comprising the low reflection layer is R4060, and the following condition is satisfied:

0% <R4060≤2.5%.

9. The optical lens assembly of claim 6, wherein a reflectance in a wavelength range of 500 nm-600 nm of the surface comprising the low reflection layer is R5060, and the following condition is satisfied:

0% <R5060≤2.4%.

10. The optical lens assembly of claim 5, wherein a reflectance in a wavelength range of 700 nm-1000 nm of the surface comprising the low reflection layer is R70100, and the following condition is satisfied:

0% <R70100≤2.2%.

11. An imaging apparatus, comprising:
an optical lens assembly; and
at least one carrier;
wherein at least one surface of the optical lens assembly or the at least one carrier comprises a low reflection layer, the low reflection layer comprises a rough layer, a nanocrystalline particle and a hydrophobic layer, the nanocrystalline particle is disposed between the rough layer and the hydrophobic layer, and the hydrophobic layer is farther away from the surface of the optical lens assembly or the at least one carrier than the nanocrystalline particle;
wherein a material of the nanocrystalline particle at least comprises $SiO_2$;
wherein an average diameter of the nanocrystalline particle is DC, and the following condition is satisfied:

200 nm<DC.

12. The imaging apparatus of claim 11, wherein a material of the hydrophobic layer is selected from at least one polyurethane compound, a polyimide compound, an organosilane compound, a fluoroalkane compound, a fluoroalkenyl ether polymer, a fluorosilane compound and a fluoroacrylate compound.

13. The imaging apparatus of claim 11, wherein the nanocrystalline particle is a multi-layer structure, and the nanocrystalline particle comprises at least one high refractive index layer and at least one low refractive index layer;
wherein the at least one high refractive index layer and the at least one low refractive index layer are arranged by alternately, the at least one low refractive index layer is closer to the hydrophobic layer than the at least one high refractive index layer, and a main material of the at least one low refractive index layer is $SiO_2$.

14. The imaging apparatus of claim 11, wherein a height of the nanocrystalline particle is Tc, and the following condition is satisfied:

200 nm<Tc<800 nm.

15. The imaging apparatus of claim 11, wherein a reflectance in a wavelength range of 400 nm-1000 nm of the surface comprising the low reflection layer is R40100, and the following condition is satisfied:

0% <R40100≤2.4%.

16. The imaging apparatus of claim 15, wherein a reflectance in a wavelength range of 400 nm-700 nm of the surface comprising the low reflection layer is R4070, and the following condition is satisfied:

0% <R4070≤2.5%.

17. The imaging apparatus of claim 16, wherein a reflectance in a wavelength range of 500 nm-700 nm of the surface comprising the low reflection layer is R5070, and the following condition is satisfied:

0% <R5070≤2.4%.

18. The imaging apparatus of claim 16, wherein a reflectance in a wavelength range of 400 nm-600 nm of the surface comprising the low reflection layer is R4060, and the following condition is satisfied:

0% <R4060≤2.5%.

19. The imaging apparatus of claim 16, wherein a reflectance in a wavelength range of 500 nm-600 nm of the surface comprising the low reflection layer is R5060, and the following condition is satisfied:

0% <R5060≤2.4%.

20. The imaging apparatus of claim 15, wherein a reflectance in a wavelength range of 700 nm-1000 nm of the surface comprising the low reflection layer is R70100, and the following condition is satisfied:

0% <R70100≤2.2%.

21. An electronic device, comprising:
the imaging apparatus of claim 11.

22. A low reflection layer, comprising:
a rough layer, a nanocrystalline particle and a hydrophobic layer, and the nanocrystalline particle is disposed between the rough layer and the hydrophobic layer;
wherein an average diameter of the nanocrystalline particle is DC, a reflectance in a wavelength range of 400 nm-1000 nm of a surface comprising the low reflection layer is R40100, and the following conditions are satisfied:

200 nm<DC<1000 nm; and

0% <R40100≤2.4%.

23. The low reflection layer of claim 22, wherein a material of the hydrophobic layer is selected from at least one polyurethane compound, a polyimide compound, an organosilane compound, a fluoroalkane compound, a fluoroalkenyl ether polymer, a fluorosilane compound and a fluoroacrylate compound.

24. The low reflection layer of claim 22, wherein the nanocrystalline particle is a multi-layer structure, and the nanocrystalline particle comprises at least one high refractive index layer and at least one low refractive index layer;
wherein the at least one high refractive index layer and the at least one low refractive index layer are arranged by alternately, the at least one low refractive index layer is closer to the hydrophobic layer than the at least one high refractive index layer, and a main material of the at least one low refractive index layer is $SiO_2$.

25. The low reflection layer of claim 22, wherein a height of the nanocrystalline particle is Tc, and the following condition is satisfied:

$$200 \text{ nm} < Tc < 800 \text{ nm}.$$

26. The low reflection layer of claim 22, wherein a reflectance in a wavelength range of 400 nm-700 nm of the surface comprising the low reflection layer is R4070, and the following condition is satisfied:

$$0\% < R4070 \leq 2.5\%.$$

27. The low reflection layer of claim 22, wherein a reflectance in a wavelength range of 700 nm-1000 nm of the surface comprising the low reflection layer is R70100, and the following condition is satisfied:

$$0\% < R70100 \leq 2.2\%.$$

* * * * *